(12) United States Patent
Cao et al.

(10) Patent No.: US 11,530,163 B2
(45) Date of Patent: Dec. 20, 2022

(54) RADIATION CURABLE COMPOSITIONS WITH MULTI-FUNCTIONAL LONG-ARMED OLIGOMERS FOR COATING OPTICAL FIBERS

(71) Applicant: Covestro (Netherlands) B.V., Nieuwegein (NL)

(72) Inventors: Huimin Cao, Elgin, IL (US); Johan Franz Gradus Antonius Jansen, Nieuwegein (NL); Marcel Houben, Nieuwegein (NL); Kangtai Ren, Elgin, IL (US)

(73) Assignee: Covestro (Netherlands) B.V., Nieuwegein (NL)

( * ) Notice: Subject to any disclaimer, the term of this patent is extended or adjusted under 35 U.S.C. 154(b) by 0 days.

(21) Appl. No.: 17/629,432

(22) PCT Filed: Jul. 30, 2020

(86) PCT No.: PCT/US2020/044129
§ 371 (c)(1),
(2) Date: Jan. 24, 2022

(87) PCT Pub. No.: WO2021/021971
PCT Pub. Date: Feb. 4, 2021

(65) Prior Publication Data
US 2022/0250978 A1   Aug. 11, 2022

Related U.S. Application Data

(60) Provisional application No. 62/880,679, filed on Jul. 31, 2019.

(51) Int. Cl.
*C03C 25/326*   (2018.01)
*C03B 37/025*   (2006.01)
(Continued)

(52) U.S. Cl.
CPC .......... *C03C 25/326* (2013.01); *C03B 37/025* (2013.01); *C03C 25/1065* (2013.01);
(Continued)

(58) Field of Classification Search
CPC ................ C09D 175/14; C09D 175/16; C08G 18/48–4895; C03C 25/326; C03C 25/1065
See application file for complete search history.

(56) References Cited

U.S. PATENT DOCUMENTS

| 3,004,896 A | 10/1961 | Heller et al. |
| 3,055,896 A | 9/1962 | Boyle et al. |

(Continued)

FOREIGN PATENT DOCUMENTS

| DE | 4027770 A | * | 3/1992 | .......... C03C 17/322 |
| JP | 10260548 A | * | 9/1998 | |

(Continued)

OTHER PUBLICATIONS

Google Translation of DE-4027770-A (Year: 2022).*
(Continued)

*Primary Examiner* — Michael M Dollinger
(74) *Attorney, Agent, or Firm* — Jed C. Benson

(57) ABSTRACT

Disclosed and claimed herein are radiation curable compositions for coating an optical fiber containing an oligomer, a diluent, a photoinitiator, and optionally, additives. The oligomer includes a reactive urethane oligomer having at least three arms, each arm having a most distal termination point and bound together at a single junction point, wherein at least one arm comprises the reaction product of a polyol, a polyisocyanate, and an isocyanate-reactive (meth)acrylate. The reactive urethane oligomer possesses specified molecular weight and/or average functionality values, and it may possess specified chain length values between the oligomer
(Continued)

Oligomer 1 junction point and the distal termination point along one or more arm(s). Also disclosed are methods of coating an optical fiber incorporating the compositions described herein, along with the coated optical fibers and cables produced therefrom.

30 Claims, 3 Drawing Sheets

(51) Int. Cl.
  *C03C 25/1065* (2018.01)
  *C08G 18/24* (2006.01)
  *C08G 18/48* (2006.01)
  *C08G 18/67* (2006.01)
  *C08G 18/76* (2006.01)
  *C09D 175/14* (2006.01)
  *G02B 6/02* (2006.01)

(52) U.S. Cl.
  CPC ....... *C08G 18/246* (2013.01); *C08G 18/4816* (2013.01); *C08G 18/4825* (2013.01); *C08G 18/4837* (2013.01); *C08G 18/6755* (2013.01); *C08G 18/7614* (2013.01); *C09D 175/14* (2013.01); *G02B 6/02395* (2013.01)

(56) References Cited

U.S. PATENT DOCUMENTS

| | | |
|---|---|---|
| 3,072,585 A | 1/1963 | Milionis et al. |
| 3,074,910 A | 1/1963 | Dickson, Jr. |
| 3,189,615 A | 6/1965 | Heller et al. |
| 3,218,332 A | 11/1965 | Heller et al. |
| 3,230,194 A | 1/1966 | Boyle |
| 4,127,586 A | 11/1978 | Rody et al. |
| 4,226,763 A | 10/1980 | Dexter et al. |
| 4,275,004 A | 6/1981 | Winter et al. |
| 4,278,589 A | 7/1981 | Dexter et al. |
| 4,315,848 A | 2/1982 | Dexter et al. |
| 4,324,744 A | 4/1982 | Lechtken et al. |
| 4,347,180 A | 8/1982 | Winter et al. |
| 4,383,863 A | 5/1983 | Dexter et al. |
| 4,675,352 A | 6/1987 | Winter et al. |
| 4,681,905 A | 7/1987 | Kubota et al. |
| 4,737,593 A | 4/1988 | Ellrich et al. |
| 4,753,817 A | 6/1988 | Meixner et al. |
| 4,853,471 A | 8/1989 | Rody et al. |
| 4,932,750 A | 6/1990 | Ansel et al. |
| 4,962,992 A | 10/1990 | Chapin et al. |
| 5,013,768 A | 5/1991 | Kiriyama et al. |
| 5,104,433 A | 4/1992 | Chapin et al. |
| 5,229,253 A | 7/1993 | Zertani et al. |
| 5,268,450 A | 12/1993 | DesLauriers et al. |
| 5,278,314 A | 1/1994 | Winter et al. |
| 5,280,124 A | 1/1994 | Winter et al. |
| 5,319,091 A | 6/1994 | Deslauriers et al. |
| 5,410,071 A | 4/1995 | Deslauriers et al. |
| 5,436,349 A | 7/1995 | Winter et al. |
| 5,516,914 A | 5/1996 | Winter et al. |
| 5,534,559 A | 7/1996 | Leppard et al. |
| 5,554,760 A | 9/1996 | Winter et al. |
| 5,563,242 A | 10/1996 | Winter et al. |
| 5,574,166 A | 11/1996 | Winter et al. |
| 5,607,987 A | 3/1997 | Winter et al. |
| 5,942,290 A | 8/1999 | Leppard et al. |
| 5,977,219 A | 11/1999 | Ravichandran et al. |
| 6,020,528 A | 2/2000 | Leppard et al. |
| 6,020,529 A | 2/2000 | Fremy |
| 6,048,660 A | 4/2000 | Leppard et al. |
| 6,166,218 A | 12/2000 | Ravichandran et al. |
| 6,486,226 B2 | 11/2002 | Al-Akhdar et al. |
| 6,486,228 B2 | 11/2002 | Kohler et al. |
| 6,579,618 B1 * | 6/2003 | Ishikawa ............... C03C 25/106 428/378 |
| 6,596,445 B1 | 7/2003 | Matsumoto et al. |
| 6,689,463 B2 | 2/2004 | Chou et al. |
| 6,775,451 B1 | 8/2004 | Botelho et al. |
| 9,708,442 B1 | 7/2017 | Lee et al. |
| 9,960,389 B1 * | 5/2018 | Hao ........................ C08L 23/20 |
| 10,889,732 B2 * | 1/2021 | Ren ..................... C03C 25/1065 |
| 2002/0013383 A1 | 1/2002 | Chawla et al. |
| 2003/0204039 A1 * | 10/2003 | Eugene .................. C08G 18/12 528/44 |
| 2007/0100039 A1 | 5/2007 | Hancock et al. |
| 2018/0163075 A1 * | 6/2018 | Ren ....................... C09D 133/10 |
| 2020/0369822 A1 * | 11/2020 | Jansen .................. C03C 25/326 |
| 2021/0208334 A1 * | 7/2021 | Wu ..................... C08G 18/4854 |
| 2022/0017773 A1 * | 1/2022 | Steeman ................. C03C 25/28 |

FOREIGN PATENT DOCUMENTS

| | | |
|---|---|---|
| WO | 9908975 A1 | 2/1999 |
| WO | 2017173296 A1 | 10/2017 |

OTHER PUBLICATIONS

Hongping Xiang et al: "Preparation, Characterization and Application of UV-Curable Flexible Hyperbranched Polyurethane Acrylate", Polymers, vol. 9, No. 12, Dec. 1, 2017, p. 552, XP055745307, ISSN: 2073-4360, DOI: 10.3390/polym9110552.
Junchao Fu et al: "Research progress of UV-curable polyurethane acrylate-based hardening coatings", Progress in Organic Coatings, vol. 131, Jun. 1, 2019, pp. 82-99, XP055745236, ISSN: 0300-9440, DOI: 10.1016/j.porgcoat.2019.01.061.
International Search Report, PCT/US2020/044129, dated Nov. 9, 2020, Authorized officer: Marco Pollio.
Polymer Molecular Weight Distribution and Definitions of MW Averages; Agilent Technologies, Apr. 30, 2015; 5990-7890EN; (https://www.agilent.com/cs/library/technicaloverviews/Public/5990-7890EN.pdf.
Schmid, Steven R. et al, "Optical Fiber Coatings", Sections 4.6 to the end of chapter 4 in the textbook, "Specialty Optical Fibers Handbook" by A. Mendez and T.F. Morse, Elsevier Inc. 2007, published by Elsevier.
Rudin et al, Chapter 1 of The Elements of Polymer Science & Engineering (Third Edition), 2013.

* cited by examiner

RADIATION CURABLE COMPOSITIONS WITH MULTI-FUNCTIONAL LONG-ARMED OLIGOMERS FOR COATING OPTICAL FIBERS

CROSS REFERENCE TO RELATED APPLICATIONS

This application is a national stage application under 35 U.S.C. § 371 of PCT/US2020/044129, filed Jul. 30, 2020, which claims the benefit of U.S. Provisional Application No. 62/880,679, filed Jul. 31, 2019, each of which is incorporated herein by reference.

TECHNICAL FIELD

The present invention relates generally to methods of coating optical fibers, the radiation curable primary coatings suitable for use on optical fibers having multi-functional long-armed oligomers, and the coated optical fibers produced therefrom.

BACKGROUND

Optical fibers are composed of glass fibers obtained by hot melt spinning of glass, and one or more coating layers disposed over the glass fibers for protective reinforcement. Optical fibers are produced, for example, by first forming a flexible primary coating layer on the surface of the glass fibers, and then forming a more rigid secondary covering layer called a secondary coating over the primary coating. Also known are tape-like optical fibers or optical fiber cables having a plurality of optical fibers with a coating layer that are bound with a binding material.

Because they are especially fast-curing and can impart the desired properties onto the optical fiber, radiation curable thermoset compositions have long been used to form the primary and secondary coating layers. Typically, radiation curable optical fiber coatings are the cured product of a composition containing a mixture of one or more components possessing one or more ethylenically unsaturated (C=C) bonds which, under the influence of irradiation, undergo crosslinking by free-radical polymerization. Such composition also typically includes a photoinitiator to assist in the radiation curing, particularly if the curing is effectuated by means of irradiation at ultraviolet (UV) wavelengths.

The relatively soft inner primary coating provides resistance to microbending which results in added attenuation of the signal transmission (i.e. signal loss) of the coated optical fiber and is therefore undesirable. Microbends are microscopic curvatures in the optical fiber involving local axial displacements of a few micrometers and spatial wavelengths of a few millimeters. Microbends can be induced by thermal stresses and/or mechanical lateral forces. Coatings can provide lateral force protection that protect the optical fiber from microbending, but as coating thickness decreases the amount of protection provided decreases.

Primary coatings preferably possess a higher refractive index than the cladding of the associated optical fiber, in order to allow them to strip errant optical signals away from the core of the optical fiber. Primary coatings should maintain adequate adhesion to the glass fiber during thermal and hydrolytic aging, yet (if needed) is capable of being strippable therefrom for splicing purposes. The primary coating typically has a thickness in the range of 20 to 50 μm (e.g., about 25 or 32.5 μm), thinner thickness in the range of 15 to 25 μm for 200 μm fibers.

The harder secondary coating provides resistance to handling forces such as those encountered when the coated optical fiber is ribboned and/or cabled. Radiation curable optical fiber secondary coating compositions also generally comprise a mixture of ethylenically-unsaturated compounds, including one or more acrylate-functional oligomers dissolved or dispersed in liquid ethylenically-unsaturated diluents and photoinitiators. The coating composition is typically applied to the optical fiber in liquid form and then exposed to actinic radiation to effect cure.

The method commonly used to form the covering layer on the glass fibers is, for example, to coat the glass fibers with a liquid curable resin composition and cure it with heat or light, and especially ultraviolet radiation. Fiber optic coatings, including the primary and secondary layers, typically are applied using one of two processes: wet-on-wet (WOW) and wet-on-dry (WOD). In the WOD process, the fiber passes first through a primary coating application, which is cured via exposure to UV radiation. The fiber then passes through a secondary coating application, which is subsequently cured by similar means. In the WOW process, the fiber passes through both the primary and secondary coating applications, whereupon the fiber proceeds to the curing step. In a wet-on-wet process, the curing lamps between primary and secondary coating application are omitted.

Although radiation curable compositions for optical fibers are known, it would be desirable to provide a coating composition, especially a primary coating composition, which is formulated so that—upon application and curing on a glass optical fiber—an increased toughness and/or tear strength is thereby imparted. It would additionally or alternatively be desirable to provide such a coating composition that is able to contribute to the production of coated optical fibers having excellent microbend resistance as approximated by those possessing low modulus values.

BRIEF SUMMARY

Figure 1:
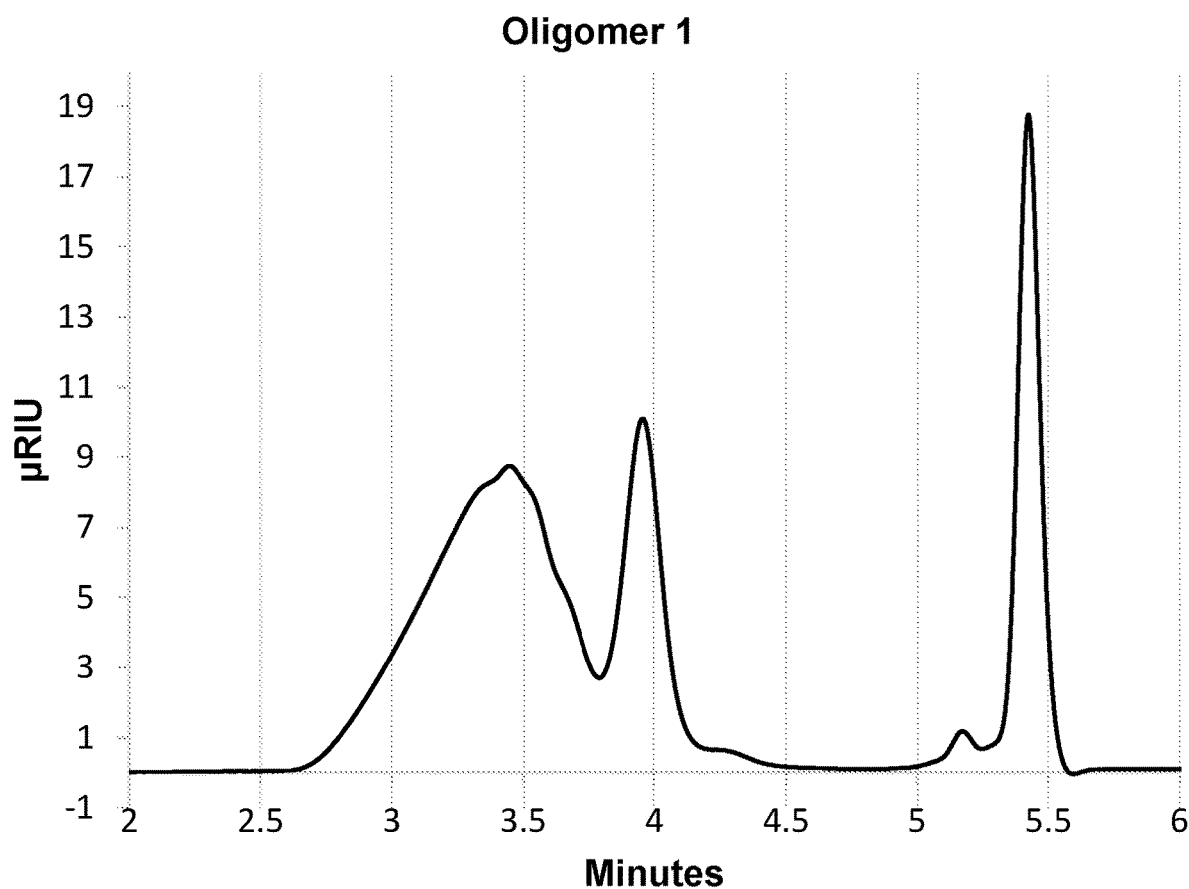
FIG. 1 depicts a size exclusion chromatography (SEC) plot of an oligomer (oligomer 1) used in the examples as shown herein.

Described herein are several aspects and embodiments of the invention. A first aspect is a radiation curable composition for coating an optical fiber including an oligomer component; a diluent component; a photoinitiator component; and optionally, an additive component; wherein the oligomer component comprises, consists essentially of, or consists of a reactive urethane oligomer having at least three arms each having a most distal termination point and bound together at a single junction point, wherein at least one arm comprises the reaction product of a polyol; a polyisocyanate; and an isocyanate-reactive (meth)acrylate; wherein the reactive urethane oligomer possesses a number average molecular weight (Mn) and a Z-average molecular weight (Mz), wherein the Mn is greater than or equal to about 10 kilodaltons (kDa), and Mz/Mn is greater than or equal to 4.5.

In another embodiment according to the first aspect, the oligomer component includes, consists of, or consists mostly of one or more oligomers according to the following structure (I):

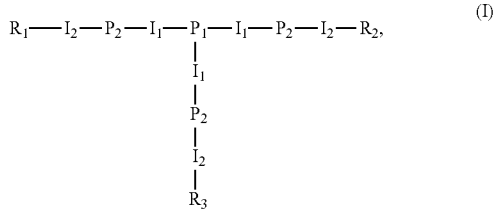

$$R_1\text{—}I_2\text{—}P_2\text{—}I_1\text{—}P_1\text{—}I_1\text{—}P_2\text{—}I_2\text{—}R_2, \quad (I)$$
$$\begin{array}{c} | \\ I_1 \\ | \\ P_2 \\ | \\ I_2 \\ | \\ R_3 \end{array}$$

wherein
- $P_1$ represents the reaction product of a polyether triol;
- $P_2$ represents the reaction product of a polyether diol;
- $I_1$ and $I_2$ are the same or are different and each represents the reaction product of a di-isocyanate compound; and
- $R_1$, $R_2$, and $R_3$ are the same or are different and at least one represents the reaction product of: (a) a hydroxy-functional (meth)acrylate or (b) a $C_1$-$C_{18}$, or $C_2$-$C_{12}$, or $C_4$-$C_{10}$ monohydric alcohol not possessing a (meth) acrylic moiety. In a preferred embodiment, at least one of $R_1$, $R_2$, and $R_3$ represents the reaction product of (a).

A second aspect of the current invention is a method for coating an optical fiber, comprising providing a glass optical fiber, preferably by drawing a glass optical fiber through a draw tower; applying a primary coating composition onto the surface of the glass optical fiber; optionally, imparting a dose of UV light sufficient to at least partially cure said primary coating composition; applying a secondary coating composition to the primary coating composition; exposing the primary coating composition and the secondary coating composition to at least one radiation source capable of emitting ultraviolet radiation to affect curing of said primary coating composition and said secondary coating composition, to form a cured primary coating on the surface of the optical fiber, and a cured secondary coating on the surface of the cured primary coating; wherein the primary coating composition is a composition according to any of the embodiments of the first aspect of the current invention.

A third aspect of the current invention is a coated optical fiber, the coated optical fiber comprising a glass core and a cladding layer in contact with and surrounding said glass core; and a coating portion, said coating portion further including a primary coating layer in contact with and surrounding said cladding layer; and a secondary coating layer in contact with and surrounding said primary coating layer. According to this third aspect, the primary coating layer is a cured product of a radiation curable composition according to any of the embodiments of the first aspect, and the primary and secondary coatings are applied and cured according to any of the embodiments of the second aspect.

According to an embodiment of the third aspect, the coated optical fiber possesses specified tear strength ($G_0$) values, such as at least 10 J/m², or at least 15 J/m², or at least 20 J/m². According to another embodiment, the coated optical fiber possesses a film modulus of less than 1.5 MPa, or less than 1.0 MPa, or less than 0.6 MPa. In yet a further embodiment, the coated optical fiber possesses a ratio of the $G_0$ value (in J/m²) to the film modulus value (in MPa) of greater than 70, or greater than 81.

A fourth aspect of the invention is an optical fiber cable, wherein the optical fiber comprises at least one optical fiber according to the third aspects of the invention, and/or wherein the optical fiber is the cured product of a composition according to the first aspect of the invention, and/or wherein the optical fiber was coated according to the second aspect of the invention.

DETAILED DESCRIPTION

A first aspect of the current invention is a radiation curable composition for use as an optical fiber primary coating comprising, consisting of, or consisting essentially of:
- an oligomer component;
- a diluent component;
- a photoinitiator component; and
- optionally, an additive component;
  wherein the oligomer component comprises, consists essentially of, or consists of a reactive urethane oligomer having at least three arms each having a most distal termination point and bound together at a single junction point, wherein at least one arm comprises the reaction product of
  - a polyol;
  - a polyisocyanate; and
  - an isocyanate-reactive (meth)acrylate;
  wherein the reactive urethane oligomer possesses a number average molecular weight (Mn) and a Z-average molecular weight (Mz),
  wherein the Mn is greater than or equal to about 10 kilodaltons (kDa), and Mz/Mn is greater than or equal to 4.5.

Radiation curable compositions for coating optical fibers according to the first aspect of the present invention contain an oligomer component, a diluent component, a photoinitiator component, and optionally, an additive component. In a preferred embodiment, the radiation curable composition for coating an optical fiber according to the first aspect of the present invention consists of a reactive oligomer component, a reactive diluent monomer component, a photoinitiator component, and an additive component comprising an adhesion promoter. Such components described below may be used in radiation curable compositions according to any of the aspects of the present invention, including compositions according to the first aspect, compositions used in methods of coating an optical fiber according to the second aspect, and compositions from which the coatings described in association with coated optical fibers according to the third aspect are cured.

Oligomer Component

Radiation curable compositions according to the present invention comprise an oligomer component; that is, a collection of one or more than one individual oligomers having one or more than one specified structure or type. An oligomer is used herein to mean a molecule of intermediate relative molecular mass, the structure of which comprises a plurality of units derived, actually or conceptually, from molecules of lower relative molecular mass. As used herein, a component is considered an oligomer if it further possesses a number average molecular weight (Mn) of greater than about 1 kilodalton (kDa), preferably as measured via a size exclusion chromatography method (SEC) as described elsewhere herein. In an embodiment, the oligomer component comprises, consists of, or consists essentially of one or more oligomers having an Mn of at least 20 kDa, or at least 30 kDa, or at least 40 kDa, or from 20 to 150 kDa, or from 20 to 130 kDa, or from 20 to 100 kDa, or from 30 to 80 kDa, or from 35 to 55 kDa. According to other embodiments, the oligomer component comprises, consists of, or consists essentially of one or more oligomers possessing a theoretical molecular weight (Mn, theo) of at least 10 kilo Daltons (kDa), more preferably greater than 12 kDa, more preferably greater than 15 kDa, more preferably greater than 17 kDa, and/or less than 150 kDa, more preferably less than 140 kDa, more preferably less than 130 kDa, more preferably less than 120 kDa, or from 15 to 120 kDa, or from 20 to 120 kDa, or from 25 to 120 kDa, or from 25 to 110 kDa, or from 25 to 100 kDa.

The oligomer component comprises one or more reactive oligomers. As used herein, "reactive" means the ability to form a chemical reaction, preferably a polymerization reaction, with another molecule. As such, a reactive compound will be said to possess at least one reactive, or functional group. It is preferred that such reactive or functional group is a polymerizable group. Although some unreactive oligomers may be contemplated for use in the current invention, a large percentage of reactive oligomers is preferred. In an embodiment, the oligomer component consists of or consists essentially of reactive oligomers.

The reactive oligomer component according to the invention comprises, consists essentially of, or consists of reactive oligomers having at least one polymerizable group. In a preferred embodiment, the reactive oligomer component consists of reactive oligomers having at least one polymerizable group. The polymerizable groups may be of any known type. In an embodiment, however, the polymerizable group may comprise, consist essentially of, or consist of acrylate or methacrylate groups, or any combination thereof. The reactive oligomers are preferably ethylenically unsaturated polymerizable compounds that contain one or more than one reactive olefinic double bond.

The polymerizable groups may occur at any feasible point along the length of the reactive oligomer, including as polymerizable backbone groups or polymerizable endgroups. Polymerizable backbone groups are present along, or branch from, a linear chain along the length of the oligomer, whereas polymerizable endgroups are polymerizable groups that are present at a terminus of the oligomer. The polymerizable groups may occur in isolation from, or directly or indirectly adjacent to other polymerizable groups, such as in a branched or forked pattern at a terminus (synonymously referred to herein as a "termination point") of an oligomer, for example. In a preferred embodiment, the polymerizable groups comprise, consist essentially of, or consist of polymerizable endgroups.

Reactive oligomers according to the present invention may be of any known type consistent with the definitions specified elsewhere herein. According to the first aspect, however, the oligomer component comprises, consists of, or consists essentially of one or more urethane oligomers, preferably reactive urethane oligomers. A urethane oligomer includes at least one urethane group or moiety, and preferably comprises at least a backbone, a polymerizable group, and a urethane group which links the backbone to the polymerizable group. According to the first aspect, the urethane oligomer comprises the reaction product of a polyol, a polyisocyanate, and an isocyanate-reactive (meth) acrylate.

Examples of suitable polyol compounds include polyether polyols, polyester polyols, polycarbonate polyols, polycaprolactone polyols, acrylic polyols, and other polyols. These polyols may be used either individually or in combinations of two or more. In a preferred embodiment, the backbone of the urethane oligomer comprises the reaction product of a polyether polyol. In an embodiment, the backbone comprises the reaction product of a polypropylene glycol (PPG). As used herein, a compound derived from a polypropylene glycol includes an endcapped PPG, such as an EO-endcapped PPG. There are no specific limitations to the manner of polymerization of the structural units in these polyols. Each of random polymerization, block polymerization, or graft polymerization is acceptable.

As used herein, a block copolymer means a portion of an oligomer or polymer, comprising many constitutional units, wherein at least one constitutional unit comprises a feature that is not present in adjacent portions. As used herein, mono-, di-, and tri-block copolymers refer to the average amount of a particular block present in the oligomer. In a preferred embodiment, the particular block refers to a polyether block, which is derived from one or more of the polyols, preferably polyether polyols, described elsewhere herein. In an embodiment, the block to which a mono-, di-, and/or tri-block copolymer refers is a polyether block which is derived from one or more of the polyols described elsewhere herein. In an embodiment, a monoblock copolymer may be described as a copolymer having only an average of around 1, or from about 0.9 to less than 1.5 units of a particular block, such as a polyether block. In an embodiment, a diblock copolymer may be described as a copolymer having an average of around 2, or from at least 1.5 to less than 2.5 units of a particular block, such as a polyether block. In an embodiment, a triblock copolymer may be described as a copolymer having an average of around 3, or from at least 2.5 to less than 3.5 units of a particular block, such as a polyether block. The number of polyether units in a given oligomer may be determined by the number of polyether polyol molecules utilized in the synthesis of a single oligomer.

Given as examples of the polyether polyols are polyethylene glycol, polypropylene glycol, polypropylene glycol-ethylene glycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds. Here, given as examples of the ion-polymerizable cyclic compounds are cyclic ethers such as ethylene oxide, isobutene oxide, tetrahydrofuran, 2-methyltetrahydrofuran, 3-methyltetrahydrofuran, dioxane, trioxane, tetraoxane, cyclohexene oxide, styrene oxide, epichlorohydrin, isoprene monoxide, vinyl oxetane, vinyl tetrahydrofuran, vinyl cyclohexene oxide, phenyl glycidyl ether, butyl glycidyl ether, and glycidyl benzoate. Specific examples of combinations of two or more ion-polymerizable cyclic compounds include combinations for producing a binary copolymer such as tetrahydrofuran and 2-methyltetrahydrofuran, tetrahydrofuran and 3-methyltetrahydrofuran, and tetrahydrofuran and ethylene oxide; and combinations for producing a ternary copolymer such as a combination of tetrahydrofuran, 2-methyltetrahydrofuran, and ethylene oxide, a combination of tetrahydrofuran, butene-1-oxide, and ethylene oxide, and the like. The ring-opening copolymers of these ion-polymerizable cyclic compounds may be either random copolymers or block copolymers.

Included in these polyether polyols are products commercially available such as, for example, PTMG1000, PTMG2000 (manufactured by Mitsubishi Chemical Corp.), PEG #1000 (manufactured by Nippon Oil and Fats Co., Ltd.), PTG650 (SN), PTG1000 (SN), PTG2000 (SN), PTG3000, PTGL1000, and PTGL2000 (manufactured by Hodogaya Chemical Co., Ltd.), PEG 400, PEG 600, PEG 1000, PEG 1500, PEG 2000, PEG 4000, and PEG 6000 (manufactured by Daiichi Kogyo Seiyaku Co., Ltd.), P710R, P1010, P2010, and the 1044 Pluracol® P Series (by BASF), the Acrol® and Acclaim® series including PPG725, PPG1000, PPG2000, PPG3000, PPG4000, and PPG8000, as well as the Multranol® series including PO/EO polyether diols having a Mw of 2800 or 40000 (by Covestro). Additionally, AGC Chemicals provides diols under the trade name Preminol®, such as Preminol S 4013F (Mw 12,000), Preminol 4318F (Mw 18,000), and Preminol 5001F (Mw 4,000).

Polyester diols obtained by reacting a polyhydric alcohol and a polybasic acid are examples of polyester polyols. Examples of the polyhydric alcohol include ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like. Examples of the polybasic acid include phthalic acid, dimer acid, isophthalic acid, terephthalic acid, maleic acid, fumaric acid, adipic acid, sebasic acid, and the like.

These polyester polyol compounds are commercially available under the trade names such as MPD/IPA500, MPD/IPA1000, MPD/IPA2000, MPD/TPA500, MPD/TPA1000, MPD/TPA2000, Kurapol® A-1010, A-2010, PNA-2000, PNOA-1010, and PNOA-2010 (manufactured by Kuraray Co., Ltd.).

Triols, such as polyester or polyether triols are also known. Especially preferred for use herein are oligo-triols, which have the general formula: A(-----OH)$_3$; wherein A is a chemical organic structure, such as an aliphatic, cycloaliphatic, aromatic, or heterocyclic structure, "-----" is an oligomeric chain, such as a polyether chain, a polyester chain, a polyhydrocarbon chain, or a polysiloxane chain, to name a few, and "OH" is a terminal hydroxy group. In an embodiment, the triol comprises, consists of, or consists essentially of a polyether triol, a PO homopolymer, a PE homopolymer, PO-EO block copolymers, random copolymer or hybrid block-random copolymers. In practice, polyether triols may be based on glycerol or trimethylolpropane, PO, EO or PO and EO copolymer with EO on terminal block or internal block and a MW of 500~15,000 Daltons. Another type of polyether triol are copolymers based on glycerol or trimethylolpropane, such as THF-PO, THF-EO, THF-PO-EO or THF-EO-PO and having a molecular weight between about 500 and 15,000 g/mol. In a preferred embodiment, the triol is derived from bio-based or natural reactants, such as certain vegetable oils and fats.

Commercial examples of suitable triols include the relevant propylene oxide-based polyether triols available from Carpenter under the Carpol® GP-designation, such as GP-1000, GP-1500, GP-1500-60, GP-3000, GP-4000, GP-5017, GP-5017-60, GP-5171, GP-6015, GP-6015-60, GP-6037-60, and GP-700. Further triols are commercially available from Covestro under the Arcol® brand, such as Arcol LHT-240 (Molecular weight "Mw" stated by the manufacturer of approximately 700 g/mol), Arcol LHT-112 (Mw 1500 g/mol), Arcol LHT LG-56 (Mw 3000 g/mol), and Arcol LHT-42 (Mw 4200 g/mol), the Multranol® tradename such as Multranol 9199 (Mw 4525 g/mol), Multranol 3900 (Mw 4800 g/mol), Multranol 3901 (Mw 6000 g/mol), and Multranol 9139 (Mw 6000 g/mol), as well as those under the trade name Acclaim® such as Acclaim 703 (Mw 700 g/mol), Acclaim 3300N (Mw 3000 g/mol), Acclaim 6300 (Mw 6000 g/mol), and Acclaim 6320 (Mw 6000 g/mol). Additionally, AGC Chemicals provides triols under the trade name Preminol®, such as Preminol S 3011 (Mw 10,000 g/mol), Preminol 7001K (Mw 7,000 g/mol), and Preminol 7012 (Mw 10,000 g/mol).

The theoretical molecular weight derived from the hydroxyl number of these polyols is usually from about 50 g/mol to about 15,000 g/mol, and preferably from about 500 and 12,000 g/mol, or from about 1,000 to about 8,000 g/mol.

The reaction product of a (poly)isocyanate compound, preferably a diisocyanate compound, may be utilized to create the urethane group or moiety in the reactive urethane oligomer according to the first aspect of the invention. As used herein, an isocyanate compound is defined as any organic compound which possesses at least one isocyanate group per molecule. Examples of suitable isocyanates include diisocyanates such as 2,4-tolylene diisocyanate, 2,6-tolylene diisocyanate, (hydrogenated) xylylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, 2,4,4 trimethyl hexamethylene diisocyanate, hexamethylene diisocyanate, 2,4- and/or 4,4'-methylenedicyclohexyl diisocyanate, methylene diphenyl diisocyanate, tetramethyl xylene diisocyanate, 1,5-pentane diisocyanate, bis(2-isocyanatoethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, and the like.

These diisocyanate compounds may be used either individually or in combinations of two or more. Preferred diisocyanates are isophorone diisocyanate, 2,2,4-trimethylhexamethylene diisocyanate, 2,4,4 trimethyl hexamethylene diisocyanate and hexamethylene diisocyanate, 2,4-tolylene diisocyanate, and 2,6-tolylene diisocyanate.

As used herein, "polyisocyanate" indicates that the isocyanate compound has two or more isocyanate moieties per molecule. In an embodiment, the oligomer component comprises, consists essentially of, or consists of a urethane oligomer which is the reaction product of one or more polyisocyanates. In addition to the diisocyanates specified above, polyisocyanates having three isocyanate groups per molecule, i.e. triisocyanates, may also be used. Known triisocyanates include biurets made from hexamethylene diisocyanate (HDI) or HDI trimers, which are commercially available from Covestro under the Desmodur® tradename and including, without limitation, Desmodur N 3200, Desmodur N 3300, Desmodur N 3390, Desmodur N 3600, Desmodur N 3800, Desmodur N 3900, Desmodur N XP 2580, Desmodur XP 2599, Desmodur XP 2675, Desmodur XP 2731, Desmodur XP 2714 and Desmodur XP 2803.

Further commercially-available triisocyanates include the Vestanat® T (IPDI-trimer) and HT (HDI-trimer) lines of polyisocyanate crosslinkers for 2 k systems, available from Evonik.

The urethane oligomer also comprises the reaction product of an isocyanate-reactive (meth)acrylate. Any suitable (meth)acrylates can be used, including monomers and oligomers, although (meth)acrylate monomers are preferred. Such isocyanate-reactive (meth)acrylates preferably include hydroxyl group-containing (meth)acrylate compounds, as such compounds are known to be reactive with isocyanates, including the polyisocyanates. Examples of the hydroxyl group-containing (meth)acrylates include (meth)acrylates derived from (meth)acrylic acid and epoxy and (meth)acrylates comprising alkylene oxides, more in particular, 2-hydroxy ethyl (meth)acrylate, 2-hydroxypropyl(meth)acrylate, 2-hydroxy-3-phenoxypropyl(meth)acrylate, and hydroxyethyl caprolactone acrylate, ethoxylated trimethylolpropane diacrylate, glycerol di(meth)acrylate, and glycerol acrylate methacrylate (i.e., 3-(Acryloyloxy)-2-hydroxypropyl methacrylate).

In an embodiment, the urethane oligomer also comprises the reaction product of a non-functional endcapper. Such a compound, when reacted into the oligomer via the (poly)isocyanate compound and/or the isocyanate-reactive (meth)acrylate, forms a distal termination point along at least one arm of a urethane oligomer along which no polymerizable group otherwise occurs. The non-functional endcapper may include non-UV curable compounds having an active hydrogen group, such as mercapto group-containing (—SH) compounds, amino group-containing (—NH$_2$) compounds, and hydroxyl group-containing compounds.

In a preferred embodiment, the urethane oligomer comprises the reaction product of a monohydric alcohol not possessing a (meth)acrylic moiety. Such compounds are preferably reactive with the aforementioned (poly)isocyanates. The monohydric alcohol not possessing a (meth)acrylic moiety may endcap the oligomer with a hydroxyl group, making that arm or chain non-polymerizable. Furthermore, it is in this way that an oligomer may possess a greater number of arms than functional groups. A three-armed oligomer that is endcapped with one hydroxyl group at one arm and with (meth)acrylic groups at the other two arms would be referred to herein as a three-armed, difunctional oligomer.

In an embodiment, the urethane oligomer component may comprise, consist of, or consist essentially of at least one reactive urethane oligomer having at least one arm, or two arms, or three arms, or more than three arms that are endcapped by a hydroxyl group. In an embodiment, the endcapped hydroxyl group is the reaction product of a monohydric alcohol compound not possessing a (meth)acrylic moiety.

In an embodiment, the monohydric alcohol compound not possessing a (meth)acrylic moiety is an aliphatic compound, such as a C$_1$-C$_{18}$, or C$_2$-C$_{12}$, or C$_4$-C$_{10}$ linear or branched monohydric alcohol not possessing a (meth)acrylic moiety.

Any suitable monohydric alcohol not possessing a (meth)acrylic moiety may be used, but in a preferred embodiment, the monohydric alcohol not possessing a (meth)acrylic moiety comprises, consists of, or consists essentially of methanol, ethanol, isopropyl alcohol, butanol, pentanol, 2-ethyl hexanol, cetyl alcohol, geraniol, inositol, menthol, or any combination thereof.

In the reaction of the components used to create a urethane oligomer, one or more urethanization catalysts are also preferably used. Such catalysts include, by way of an example, copper naphthenate, cobalt naphthenate, zinc naphthenate, bismuth, di-n-butyl tin dilaurate, triethylamine, and triethylenediamine-2-methyltriethyleneamine. The catalyst may be used in any suitable amount, or for example from about 0.01 to about 1 wt. % of the total amount of the reactant. The reaction may be carried out at any suitable temperature, such as a temperature from about 10 to about 90° C., and preferably from about 30 to about 80° C.

In an embodiment, the urethane oligomer comprises difunctional reactive urethane oligomers. As used herein, difunctional means possession of an average of between 1.5 to 2.5 polymerizable groups per molecule, as determined by, for example, a nuclear magnetic resonance spectroscopy (NMR) method. In other embodiments, however, the oligomer component comprises, consists essentially of, or consists of trifunctional reactive urethane oligomers, or oligomers possessing an average of greater than 2.5 to 3.5 polymerizable groups per molecule. In another embodiment, the oligomer component comprises tetrafunctional oligomers, or those having an average of greater than 3.5 to 4.5 polymerizable groups per molecule. In a preferred embodiment, the oligomer component comprises, consists essentially of, or consists of one or more reactive urethane oligomers having an average (meth)acrylate functionality of between 1.5 and 4.2, or from 1.8 to 3.8, or from 1.8 to 3.2, or from 1.8 to 2.8. In an embodiment, the average (meth)acrylate functionality of the oligomer component is between 1.5 and 4.2, or from 1.8 to 3.8, or from 1.8 to 3.2, or from 1.8 to 2.8.

The urethane oligomer component according to the first aspect of the invention preferably comprises, consists essentially of, or consists of one or more than one type of reactive urethane oligomer having at least three arms, or exactly three arms, wherein each arm possesses a termination point and wherein each of the tree arms are bound together at a single junction. As used herein, an arm represents a branch or linear chain of bonded atoms which emanate from a point, main chain, backbone, or central structure. Such arms, in an unpolymerized state, have a terminus or number of termination points at the end of the chain or branch that are not covalently bonded to another atom. As used herein, a "junction" or "junction point" refers to any location along the structure wherein two or more arms meet. By way of an example, glycerol has a junction point located at the central carbon atom to which all three arms terminating in hydroxyl groups connect as shown below:

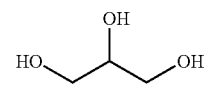

In the case of a star polymer, however, the junction would be located at the central core structure, given that the arms of a star polymer may not directly intersect. Regardless, the oligomer possessing at least three arms according to the first aspect of the invention may be of any suitable type, although branched oligomers are preferred. Basic polymer structures are discussed in Chapter 1 of Rudin et al., *The Elements of Polymer Science & Engineering* (Third Edition), 2013. In an embodiment, the oligomer possessing at least three arms is a star oligomer, which is a branched oligomer consisting of several linear chains linked to a central core. The star oligomer may possess any suitable oligomer architecture, including star-block copolymer, asymmetric, and miktoarm sub-types. Various star polymers and the synthesis thereof is discussed in M. Pitsikalis, *Reference Module in Chemistry, Molecular Sciences and Chemical Engineering,* 2013.

In a preferred embodiment, the junction point of the reactive urethane oligomer is located along the reaction product of a trifunctional core compound. This trifunctional core compound can readily facilitate the synthesis of a reactive urethane oligomer having three arms. In another embodiment, the trifunctional core compound comprises, consists of, or consists essentially of a triisocyanate compound. In another embodiment, this trifunctional core compound comprises, consists of, or consists essentially of a triol, such as a polyether triol. In an embodiment, the triol used possesses three individual arms even prior to oligomer synthesis and therefore contributes to the formation of the oligomer's three individual arms in addition to its junction point. In an embodiment, the theoretical molecular weight of one, more than one, or all of the arms of the trifunctional core compound is at least 2 kDa, or at least 3 kDa, or at least 5 kDa, or between 2 to 10 kDa, or between 2 to 8 kDa, or between 2 to 7 kDa, or between 3 to 10 kDa, or between 3 to 7 kDa. In an embodiment, the triol possesses a theoretical molecular weight of at least 3 kDa, or at least 5 kDa, or at least 6 kDa, or at least 9 kDa, or between 5 kDa and 35 kDa, or between 5 kDa and 30 kDa, or between 5 kDa and 20 kDa, or between 6 kDa and 15 kDa.

Irrespective of whether the trifunctional or triol core compound contributes to the formation of one or more arms, at least one arm of the reactive urethane oligomer according to the first aspect of the invention comprises the reaction product of a polyol, a polyisocyanate, and an isocyanate-reactive (meth)acrylate. In other embodiments, at least two arms, or three arms, comprise the reaction product of such reactants. In an embodiment, the reactive urethane oligomer comprises the reaction product of a polyol, a polyisocyanate, and a monohydric alcohol not possessing a (meth)acrylic moiety. In an embodiment, the reactive urethane oligomer comprises the reaction product (if any) of a urethanization catalyst as well. Suitable examples of polyols, polyisocyanates, isocyanate-reactive (meth)acrylates, monohydric alcohols not possessing a (meth)acrylic moiety, and urethanization catalysts are described elsewhere herein, above.

In a preferred embodiment, the reactive urethane oligomer having at least three arms each arm having a most distal termination point and bound together at a single junction point according to the first aspect possesses specified chain lengths between the junction point and the most distal termination point along three arms of the reactive urethane oligomer. As used herein, the "chain length" is defined as the atomic weight of all individual atoms directly linked between two specified points along a chain. Referring again to the glycerol example used above, the chain length between the junction point and the three termination points, from left to right in the figure above, is 31, 17, and 31 atomic units, respectively.

According to the first aspect of the invention, the oligomer component comprises a reactive urethane oligomer having at least three arms each having a most distal termination point and bound together at a single junction point, wherein a chain length between the junction point and the most distal termination point along three arms of the reactive urethane oligomer is at least 3 kilodaltons (kDa), or at least 4 kDa, or at least 5 kDa, or at least 6 kDa, or at least 7 kDa, or at least 8 kDa, or at least 10 kDa, and at most 60 kDa, or at most 50 kDa, or at most 40 kDa, or at most 35 kDa, or preferably from 4 kDa to 35 kDa. Although longer chain lengths are preferred, if they become too long, the viscosity of the radiation curable composition with which they are associated may become too high to facilitate ready optical fiber coating processability.

Inventors have discovered that compositions possessing such "long-armed" oligomers, especially those having long-armed trifunctional oligomers, are suitable for use in optical fiber coating applications and further impart industry-desired properties into the coatings produced therefrom. Without wishing to be bound by any theory, Inventors theorize that such long-armed oligomers form "polymer loops" during the application and curing. These polymer loops form knots and intertwine to facilitate the creation of an optical fiber coating with improved tear strength. This will beneficially improve the cavitation resistance of the optical fiber coating. Surprisingly, it has been observed that such oligomers can contribute to this improvement without sacrificing (i.e. significantly raising) the desirable low modulus values, which is also an important characteristic of modern high-performance optical fiber primary coatings. It is hypothesized that at three arms on the oligomer facilitate the creation of polymer loops more easily than two-armed oligomers, which are believed to form less effective "chain entanglements." Furthermore, it is believed to be important that such polymer loops are more easily formed if the arms of the trifunctional oligomer are sufficiently long, such as those possessing chain lengths of the amounts specified above.

In a preferred embodiment, the oligomer component comprises, consists of, or consists essentially of a three-armed oligomer(s) according to the following structure (I):

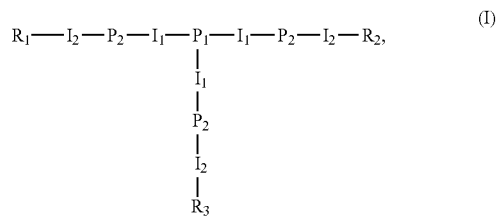

wherein
$P_1$ represents the reaction product of a polyether triol preferably possessing an Mn or Mn, theo of at least 3 kDa, or at least 5 kDa, or at least 6 kDa, or at least 9 kDa, or between 5 kDa and 20 kDa, or between 6 kDa and 15 kDa;
$P_2$ represents the reaction product of a polyether diol;
$I_1$ and $I_2$ are the same or are different and each represents the reaction product of a di-isocyanate compound; and
$R_1$, $R_2$, and $R_3$ are the same or are different and at least one represents the reaction product of: (a) a hydroxy-functional (meth)acrylate or (b) a $C_1$-$C_{18}$, or $C_2$-$C_{12}$, or $C_4$-$C_{10}$ monohydric alcohol not possessing a (meth)acrylic moiety. In a preferred embodiment, at least one of $R_1$, $R_2$, $R_3$ and $R_4$ represents the reaction product of (a).

In structure (I), the junction point of the oligomer lies at the point along the polyether triol $P_1$ where each of the three polyether chains meet. The chain length, meanwhile, represents the molecular weight of all the atoms corresponding to the portion of $P_1$ for a respective arm, plus that of $I_1$, $P_2$, $I_2$, and the relevant $R_n$ group.

In an alternative embodiment, the oligomer component comprises, consists of, or consists essentially of a three-armed oligomer(s) according to the following structure (II):

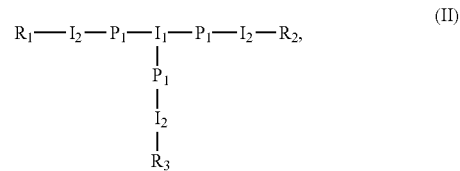

wherein $I_1$ represents the reaction product of a triisocyanate compound;
$P_1$ represents the reaction product of a polyether polyol, preferably a polyether diol;
$I_2$ represents the reaction product of a polyisocyanate compound, preferably a diisocyanate; and $R_1$, $R_2$, and $R_3$ are the same or are different and at least one represents the reaction product of: (a) a hydroxy-functional (meth)acrylate or (b) a $C_1$-$C_{18}$, or $C_2$-$C_{12}$, or $C_4$-$C_{10}$ monohydric alcohol not possessing a (meth)acrylic moiety. In a preferred embodiment, at least one of $R_1$, $R_2$, $R_3$ and $R_4$ represents the reaction product of (a).

In yet a further embodiment, the oligomer component comprises, consists of, or consists essentially of a four-armed oligomer(s) according to the following structure (III):

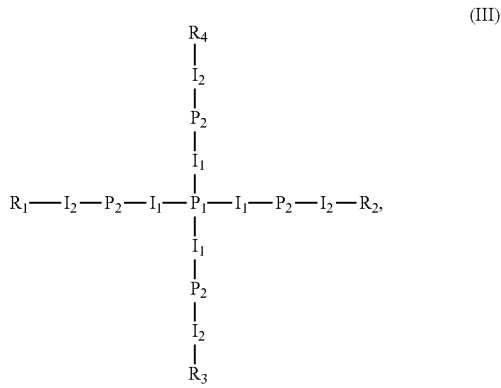

wherein $P_1$ represents the reaction product of a polyether tetraol;
$P_2$ represents the reaction product of a polyether diol;
$I_1$ and $I_2$ are the same or are different and each represents the reaction product of a di-isocyanate compound; and
$R_1$, $R_2$, $R_3$ and $R_4$ are the same or are different and at least one represents the reaction product of: (a) a hydroxy-functional (meth)acrylate or (b) a $C_1$-$C_{18}$, or $C_2$-$C_{12}$, or $C_4$-$C_{10}$ monohydric alcohol not possessing a (meth)acrylic moiety. In a preferred embodiment, at least one of $R_1$, $R_2$, $R_3$ and $R_4$ represents the reaction product of (a).

In yet a further embodiment, the oligomer component comprises, consists of, or consists essentially of a four-armed oligomer(s) according to the following structure (IV):

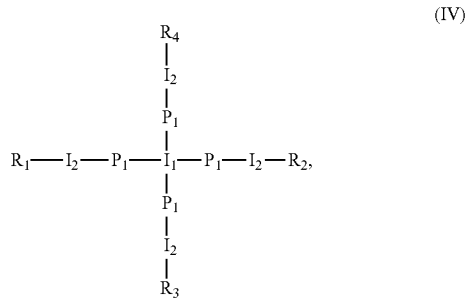

wherein $I_1$ represents the reaction product of tetraisocyanate compound;
$P_1$ represents the reaction product of a polyether diol;
$I_2$ represents the reaction product of a di-isocyanate compound; and
$R_1$, $R_2$, $R_3$ and $R_4$ are the same or are different and at least one represents the reaction product of: (a) a hydroxy-functional (meth)acrylate or (b) a $C_1$-$C_{18}$, or $C_2$-$C_{12}$, or $C_4$-$C_{10}$ monohydric alcohol not possessing a (meth)acrylic moiety. In a preferred embodiment, at least one of $R_1$, $R_2$, $R_3$ and $R_4$ represents the reaction product of (a).

In an embodiment, the chain length between the junction point and the most distal termination point along at least one, more than one, or each of the arms of the reactive urethane oligomers of any of structures (I)-(IV) is at least 3 kilodaltons (kDa), or at least 4 kDa, or at least 5 kDa, or at least 6 kDa, or at least 7 kDa, or at least 8 kDa, or at least 10 kDa, and at most 60 kDa, or at most 50 kDa, or at most 40 kDa, or at most 35 kDa, or preferably from 4 kDa to 35 kDa.

In an embodiment, the oligomer component comprises, consists of, or consists essentially of a reactive urethane oligomer according to any of structures (I)-(IV), wherein the oligomer according to any of structures (I)-(IV) possesses a theoretical molecular weight of at least 20 kilodaltons (kDa), or at least 30 kDa, or at least 40 kDa, or from 20 to 100 kDa, or from 30 to 80 kDa, or from 35 to 55 kDa.

According to an embodiment, it is expressly contemplated that the oligomer component of compositions according to the present invention may possess at least one oligomer having a structure corresponding with any of structures (I)-(IV) above. It is further possible that the oligomer component possesses at least one oligomer having more than one structure corresponding to formulae (I)-(IV), such as, by way of an example, an oligomer component possessing an oligomer chosen from structures (I) and (II); (I) and (III); (I) and (IV); (II) and (III); (II) and (IV); (III) and (IV); (I), (II), and (III), (I), (II), and (IV); (II), (III), and (IV); or (I), (III), and (IV). It is of course further possible that the oligomer component possesses each of the oligomers having structures corresponding to formulae (I), (II), (III), and (IV).

One or more of the aforementioned reactive urethane oligomers can be employed in compositions according to the present invention in any suitable amount and may be chosen singly or in combination of one or more of the types enumerated herein. Because the reactive urethane oligomers described elsewhere herein, and particularly long-armed trifunctional and tetrafunctional reactive urethane oligomers, tend to possess a higher viscosity value than those typically used in optical fiber coating applications, the total quantity of their use may need to be limited in the entire formulation in amounts that will be appreciated by the skilled person to which this invention belongs to ensure a composition with a viscosity suitable for the particular optical fiber coating application being employed. In an embodiment, therefore, the oligomer component or reactive urethane oligomer is present in an amount, relative to the entire weight of the composition, in an amount less than 65 wt. %, or from 10-65 wt. %, or from 10-55 wt. %, or from 10-50 wt. %, or from 10-40 wt. %; or from 15-65 wt. %, or from 15-55 wt. %, or from 15-50 wt. %, or from 15-40 wt. %; or from 20-65 wt. %, or from 20-55 wt. %, or from 20-50 wt. %, or from 20-40 wt. %; or from 25-65 wt. %, or from 25-55 wt. %, or from 25-50 wt. %, or from 25-40 wt. %; or from 30-65 wt. %, or from 30-55 wt. %, or from 30-50 wt. %, or from 30-40 wt. %.

Diluent Component

Compositions according to the first aspect of the present invention also include a diluent component; that is, a collection of one or more than one individual diluents having one or more than one specified structure or type. As used herein, a "diluent" means a substance which reduces the viscosity of the greater composition into which it is added or with which it is associated. A variety of diluents are used to maximize the flowability, and in turn the processability, of the optical fiber coating compositions with which they are associated.

To maximize curability of the composition associated therewith, the diluent component preferably comprises, consists of, or consists essentially of reactive diluents. As specified with respect to the qualification of the oligomer component described elsewhere herein, "reactive" means the ability to form a chemical reaction, preferably a polymerization reaction, with another molecule. As such, a reactive compound will be said to possess at least one reactive, or functional, group. It is preferred that such reactive or functional group is a polymerizable group.

It is further preferable that the diluent component comprises, consists of, or consists essentially of reactive diluent monomers. A monomer is a molecule of low relative molecular mass, the structure of which can undergo polymerization thereby contributing constitutional units to the essential structure of a macromolecule. As used herein, a component is considered a monomer if it further possesses a number average molecular weight (Mn) that is less than about 1000 g/mol. In an embodiment, the reactive diluent component consists of one or more reactive diluent monomers having an Mn from about 86 g/mol (the molar mass of methyl acrylate) to 800 g/mol, or from 100 g/mol to 350 g/mol, as determined by an NMR method.

The diluent component according to the invention comprises, consists essentially of, or consists of reactive diluent monomers having at least one polymerizable group. In a preferred embodiment, the reactive diluent monomer component consists of reactive diluent monomers having, on average, one polymerizable group. The polymerizable group(s) of the reactive diluent monomer are preferably able to (co)polymerize with the polymerizable groups present in the associated reactive oligomer component.

The polymerizable groups of the reactive diluent may be of any known type. In an embodiment, however, the polymerizable group may comprise, consist essentially of, or consist of acrylate, acrylamide, or N-vinyl amide groups, or any combination thereof. The reactive diluents are preferably ethylenically unsaturated polymerizable compounds that contain at least one reactive olefinic double bond.

The polymerizable group(s) may occur at any feasible point along the length of the reactive diluent. In a preferred embodiment, however the polymerizable groups comprise, consist essentially of, or consist of polymerizable end-groups.

The diluent component according to the present invention may include any known type of compound or substance consistent with the definitions specified elsewhere herein. In a preferred embodiment, however, the diluent component comprises, consists essentially of, or consists of one or more reactive diluent monomers containing one double bond.

Typical examples of such reactive diluent monomers containing one double bond are alkyl or hydroxyalkyl acrylates, for example methyl, ethyl, butyl, 2-phenoxy ethyl, 2-ethylhexyl, and 2-hydroxyethyl acrylate, isobornyl acrylate, methyl and ethyl acrylate, lauryl-acrylate, ethoxylated nonyl-phenol acrylate, and diethylene-glycol-ethyl-hexyl acylate (DEGEHA). Further examples of these monomers are acrylonitrile, acrylamide, N-substituted acrylamides, vinyl esters such as vinyl acetate, styrene, alkylstyrenes, halostyrenes, N-vinylpyrrolidone, N-vinyl caprolactam, vinyl chloride and vinylidene chloride. Examples of monomers containing more than one double bond are ethylene glycol diacrylate, propylene glycol diacrylate, tripropylene glycol diacrylate, neopentyl glycol diacrylate, hexamethylene glycol diacrylate, bisphenol A diacrylate, 4,4'-bis(2-acryloyloxyethoxy)diphenyl propane, trimethylolpropane triacrylate, pentaerythritol triacrylate and tetraacrylate, and vinyl acrylate.

In a preferred embodiment, the diluent component comprises, consists essentially of, or consists of one or more monofunctional diluent monomers. As used herein, "monofunctional" means possession of an average of between 0.5 to 1.4 polymerizable groups per molecule, as determined by an NMR method. In a preferred embodiment, the diluent component comprises, consists of, or consists essentially of functional monomers, such as (meth)acrylic monomers.

One or more of the aforementioned diluents can be employed in compositions according to the present invention in any suitable amount in order to tune the viscosity of the formulation with which they are associated to be suitable for the optical fiber coating process to be used therewith according to methods well-known in the art to which this invention applies, and may be chosen singly or in combination of one or more of the types enumerated herein. In an embodiment, the diluent component is present in an amount, relative to the entire weight of the radiation curable composition, from 20 wt. % to 85 wt. %, or from 30 to 85 wt. %, or from 30 to 80 wt. %, or from 30 to 75 wt. %, or from 30 to 70 wt. %, or from 30 to 65 wt. %, or from 30 to 60 wt. %, or from 30 to 50 wt. %, or from 35 to 85 wt. %, or from 35 to 75 wt. %, or from 35 to 65 wt. %, or from 35 to 55 wt. %, or from 40 to 85 wt. %, or from 40 to 75 wt. %, or from 40 to 65 wt. %, or from 40 to 55 wt. %, or from 50 to 85 wt. %, or from 50 to 75 wt. %, or from 50 to 65 wt. %.

Photoinitiator Component

According to the first aspect, the radiation curable composition includes a photoinitiator component; that is, a collection of one or more than one individual photoinitiators having one or more than one specified structure or type. A photoinitiator is a compound that chemically changes due to the action of light or the synergy between the action of light and the electronic excitation of a sensitizing dye to produce at least one of a radical, an acid, and a base. Well-known types of photoinitiators include cationic photoinitiators and free-radical photoinitiators. According to an embodiment of the present invention, the photoinitiator is a free-radical photoinitiator.

In an embodiment, the photoinitiator component includes, consists of, or consists essentially of one or more acylphosphine oxide photoinitiators. Acylphosphine oxide photoinitiators are known, and are disclosed in, for example, U.S. Pat. Nos. 4,324,744, 4,737,593, 5,942,290, 5,534,559, 6,020,529, 6,486,228, and 6,486,226. Preferred types of acylphosphine oxide photoinitiators for use in the photoinitiator component include bisacylphosphine oxides (BAPO) or monoacylphosphine oxides (MAPO). More specifically, examples include 2,4,6-trimethylbenzoylethoxyphenylphosphine oxide (CAS #84434-11-7) or 2,4,6-trimethylbenzoyl-diphenylphosphine oxide (CAS #127090-72-6).

The photoinitiator component may also optionally comprise, consist of, or consist essentially of α-hydroxy ketone photoinitiators. For instance, suitable α-hydroxy ketone photoinitiators are α-hydroxycyclohexyl phenyl ketone, 2-hydroxy-2-methyl-1-phenylpropanone, 2-hydroxy-2-methyl-1-(4-isopropylphenyl)propanone, 2-hydroxy-2-methyl-1-(4-dodecylphenyl)propanone, 2-Hydroxy-1-{4-[4-(2-hydroxy-2-methyl-propionyl)-benzyl]-phenyl}-2-methyl-propan-1-one and 2-hydroxy-2-methyl-1-[(2-hydroxyethoxy)phenyl]propanone.

In another embodiment, the photoinitiator component includes, consists of, or consists essentially of: α-aminoketones, such as 2-methyl-1-[4-(methylthio)phenyl]-2-(4-morpholinyl)-1-propanone, 2-benzyl-2-(dimethylamino)-1-[4-(4-morpholinyl)phenyl]-1-butanone, 2-(4-methylbenzyl-2-(dimethylamino)-1-[4-(4-morpholinyl)phenyl]-1-butanone or 2-benzyl-2-(dimethylamino)-1-[3,4-dimethoxyphenyl]-1-butanone; benzophenones, such as benzophenone, 2,4,6-trimethylbenzophenone, 4-methylbenzophenone, 2-methylbenzophenone, 2-methoxycarbonylbenzophenone, 4,4'-bis(chloromethyl)-benzophenone, 4-chlorobenzophenone, 4-phenylbenzophenone, 4,4'-bis(dimethylamino)-benzophenone, 4,4'-bis(diethylamino)benzophenone, methyl2-benzoylbenzoate, 3,3'-dimethyl-4-methoxybenzophenone, 4-(4-methylphenylthio)benzophenone, 2,4,6-trimethyl-4'-phenyl-benzophenone or 3-methyl-4'-phenyl-benzophenone; ketal compounds, for example 2,2-dimethoxy-1,2-diphenyl-ethanone; and monomeric or dimeric phenylglyoxylic acid esters, such as methylphenylglyoxylic acid ester, 5,5'-oxo-di(ethyleneoxydicarbonylphenyl) or 1,2-(benzoylcarboxy)ethane.

Yet further suitable photoinitiators for use in the photoinitiator component include oxime esters, such as those disclosed in U.S. Pat. No. 6,596,445. Still another class of suitable photoinitiators for use in the photoinitiator component include, for example, phenyl glyoxalates, for example those disclosed in U.S. Pat. No. 6,048,660.

In another embodiment, the photoinitiator component may comprise, consist of, or consist essentially of one or more alkyl-, aryl-, or acyl-substituted compounds not mentioned above herein.

According to another embodiment, the composition may contain a photoinitiator that is an alkyl-, aryl-, or acyl-substituted compound. In an embodiment the alkyl-, aryl-, or acyl-substituted photoinitiator possesses or is centered around an atom in the Carbon (Group 14) group. In such instance, upon excitation (via absorption of radiation) the Group 14 atom present in the photoinitiator compound forms a radical. Such compound may therefore produce a radical possessing or centered upon an atom selected from the group consisting of silicon, germanium, tin, and lead. In an embodiment, the alkyl-, aryl-, or acyl-substituted photoinitiator is an acylgermanium compound. Such photoinitiators are described in, U.S. Pat. No. 9,708,442, assigned to DSM IP Assets B.V., which is hereby incorporated by reference in its entirety. Known specific acylgermanium photoinitiators include benzoyl trimethyl germane (BTG), tetracylgermanium, or bis acyl germanoyl (commercially available as Ivocerin® from Ivoclar Vivadent AG, 9494 Schaan/Liechtenstein).

Photoinitiators according to the present invention may be employed singularly or in combination of one or more as a blend. Suitable photoinitiator blends are for example disclosed in U.S. Pat. No. 6,020,528 and U.S. Pat. app. No. 60/498,848. According to an embodiment, the photoinitiator component includes a photoinitiator blend of, for example, bis(2,4,6-trimethylbenzoyl) phenyl phosphine oxide (CAS #162881-26-7) and 2,4,6,-trimethylbenzoylethoxyphenylphosphine oxide (CAS #84434-11-7) in ratios by weight of about 1:11, 1:10, 1:9, 1:8 or 1:7.

Another especially suitable photoinitiator blend is a mixture of bis(2,4,6-trimethylbenzoyl)phenyl phosphine oxide, 2,4,6,-trimethylbenzoylethoxyphenylphosphine oxide and 2-hydroxy-2-methyl-1-phenyl-1-propanone (CAS #7473-98-5) in weight ratios of for instance about 3:1:15 or 3:1:16 or 4:1:15 or 4:1:16. Another suitable photoinitiator blend is a mixture of bis(2,4,6-trimethylbenzoyl)phenyl phosphine oxide and 2-hydroxy-2-methyl-1-phenyl-1-propanone in weight ratios of for instance about 1:3, 1:4 or 1:5.

One or more of the aforementioned photoinitiators can be employed for use in the photoinitiator component in compositions according to the first aspect of the present invention in any suitable amount and may be chosen singly or in combination of one or more of the types enumerated herein. In a preferred embodiment, the photoinitiator component comprises, consists of, or consists essentially of free-radical photoinitiators. In an embodiment, the photoinitiator component is present in an amount, relative to the entire weight of the composition, of from about 0.1 wt. % to about 10 wt. %, or from about 0.1 wt. % to about 5 wt. %, or from about 1 wt. % to about 5 wt. %.

Additives

Radiation curable compositions according to the present invention optionally include an additive component; that is, a collection of one or more than one individual additives having one or more than one specified structure or type. Additives are also typically added to optical fiber coatings to achieve certain desirable characteristics such as improved adhesion to the glass optical fiber, improved shelf life, improved coating oxidative and hydrolytic stability, and the like. There are many different types of desirable additives, and the invention discussed herein is not intended to be limited by these, nevertheless they are included in the envisioned embodiments since they have desirable effects.

Examples additives for use in the additive component include thermal inhibitors, which are intended to prevent premature polymerization, examples being hydroquinone, hydroquinone derivatives, p-methoxyphenol, beta-naphthol or sterically hindered phenols, such as 2,6-di(tert-butyl)-p-cresol. The shelf life in the dark can be increased, for example, by using copper compounds, such as copper naphthenate, copper stearate or copper octoate, phosphorus compounds, for example triphenylphosphine, tributylphosphine, triethyl phosphite, triphenyl phosphite or tribenzyl phosphite, quaternary ammonium compounds, such as tetramethylammonium chloride or trimethylbenzylammonium chloride.

In order to keep out atmospheric oxygen during the polymerization, additives such as paraffin or similar wax-like substances can be added; these migrate to the surface on commencement of the polymerization because of their low solubility in the polymer and form a transparent surface layer which prevents the ingress of air. It is likewise possible to apply an oxygen barrier layer.

Further potentially suitable additives include light stabilizers. Light stabilizers include UV-absorbers such as the well-known commercial UV absorbers of the hydroxyphenylbenzotriazole, hydroxyphenyl-benzophenone, oxalamide or hydroxyphenyl-s-triazine type. It is possible to use individual such compounds or mixtures thereof, with or without the use of sterically hindered relatively non-basic amine light stabilizers (HALS). Sterically hindered amines are for example based on 2,2,6,6-tetramethylpiperidine. UV absorbers and sterically hindered amines include, for example the following:

2-(2-Hydroxyphenyl)-2H-benzotriazoles, for example known commercial hydroxyphenyl-2H-benzotriazoles and benzotriazoles, which are disclosed in U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905; 4,853,471; 5,268,450; 5,278,314; 5,280,124; 5,319, 091; 5,410,071; 5,436,349; 5,516,914; 5,554,760; 5,563,242; 5,574,166; 5,607,987; 5,977,219; and 6,166,218 such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-dit-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

Another example class includes 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Yet another example class includes esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Additional additives suitable for use in the additive component include compounds which accelerate photopolymerization, such as so-called photosensitizers, which shift or broaden the spectral sensitivity of the composition into which they are incorporated. Photosensitizers include, in particular, aromatic carbonyl compounds, such as benzophenone derivatives, thioxanthone derivatives, anthraquinone derivatives and 3-acylcoumarin derivatives, and also 3-(aroylmethylene)thiazolines, and also eosine, rhodamine and erythrosine dyes. Alternatively, non-aromatic carbonyl compounds may be used. An example of a non-aromatic carbonyl is dimethoxy anthracene.

The curing procedure can be assisted in particular by using additives which create or facilitate the creation of pigmented compositions. Such additives include pigments such as titanium dioxide, and also include additives which form free radicals under thermal conditions, for example an azo compound such as 2,2'-azobis(4-methoxy-2,4-dimethylvaleronitrile), a triazene, a diazo sulfide, a pentazadiene or a peroxy compound, such as a hydroperoxide or peroxycarbonate, for example t-butyl hydroperoxide, as described in U.S. Pat. No. 4,753,817. Further suitable substances for this purpose include benzopinacol compounds.

The additive component may include a photo reducible dye, for example xanthene, benzoxanthene, benzothioxanthene, thiazine, pyronine, porphyrin or acridine dyes, and/or a trihalomethyl compound which can be cleaved by radiation. Such additives are described, for example, in U.S. Pat. No. 5,229,253.

Other conventional additives may be used depending on the intended application. Examples include fluorescent whiteners, fillers, pigments, dyes, wetting agents or levelling assistants. Thick and pigmented coatings can also contain glass microbeads or powdered glass fibers, as described in U.S. Pat. No. 5,013,768, for example.

In an embodiment, the additive component includes one or more of the various additives that are used to enhance one or more properties of the primary coating. Such additives include antioxidants (such as Irganox 1035, a thiodiethylene bis[3-(3,5-di-tert-butyl-4-hydroxyphenyl)propionate], or tert-Butylhydroquinone), adhesion promoters, inhibitors (such as acrylic acid), photosensitizers, carrier surfactants, tackifiers, catalysts, stabilizers, surface agents, and optical brighteners.

In a preferred embodiment, the additive component includes, consists of, or consists essentially of one or more adhesion promoter compounds. Adhesion promoters provide a link between the polymer primary coating and the surface of the optical glass fiber. Silane coupling agents, which are hydrolyzable, have been used as glass adhesion promoters. Silane coupling agents are described in, i.a, U.S. Pat. No. 4,932,750. In an embodiment, the adhesion promoter is a hydrolysable silane compound which contains a mercapto group and/or a plurality of alkoxy groups. Such adhesion promoters are known and are described in, U.S. Pat. App. No. 20020013383, the relevant portions of which are hereby incorporated by reference.

In an embodiment, the adhesion promoter includes one or more of gamma-mercaptopropyltrimethoxysilane, trimethoxysiliylpropyl acrylate, or 3-trimetoxysilylpropane-1-thiol. Silane coupling groups may alternatively be reacted onto oligomers in the oligomer component; in such case they will be considered not as an additive but as part of the oligomer component.

One or more of the aforementioned additives can be employed in compositions according to the present invention in any suitable amount and may be chosen singly or in combination of one or more of the types enumerated herein. In a preferred embodiment, the additive component is present in an amount, relative to the entire weight of the composition, from about 0 wt. % to 40 wt. %, or from 0 wt. % to 30 wt. %, or from 0 wt. % to 20 wt. %, or from 0 wt.

% to 10 wt. %, or from 0 wt. % to 5 wt. %; or from 0.01 wt. % to 40 wt. %; or from 0.01 wt. % to 30 wt. %, or from 0.01 wt. % to 20 wt. %, or from 0.01 wt. % to 10 wt. %, or from 0.01 wt. % to 5 wt. %, or from 0.1 wt. % to 2 wt. %. According to another embodiment, the additive component is present, relative to the weight of the entire radiation curable composition, from 1 wt. % to 40 wt. %, or from 1 wt. % to 30 wt. %, or from 1 wt. % to 20 wt. %, or from 1 wt. % to 10 wt. %, or from 1 wt. % to 5 wt. %.

As noted, compositions formulated according to various embodiments of the first aspect of the present invention may possess superior characteristics. Specifically, such compositions are capable of forming cured coating having a low modulus and/or a high tear strength. In an embodiment, therefore the composition according to the first aspect of the invention possesses a low modulus as measured by the segment modulus (E) of a cured film formed from the composition of less than 1.5 megapascals (MPa), or less than 1.0 MPa, or less than 0.5 MPa, or less than 0.4 MPa, or less than 0.3 MPa; or from 0.15 to 1.0 MPa, or from 0.2 to 1.0 MPa, or from 0.25 to 0.75 MPa, or from 0.25 to 0.5 MPa, or from 0.25 to 0.8 MPa, or from 0.6 to 0.8 MPa.

In an embodiment, the composition possesses a high tear strength as measured by the strain energy release rate $G_0$ value of a film created from the composition, when measured according to ISO 816 ($2^{nd}$ Edition dated 1983 Dec. 1) of at least 5 J/m$^2$, or at least 9 J/m$^2$, or at least 10 J/m$^2$, or at least 15 J/m$^2$, or at least 25 J/m$^2$, or greater than 28 J/m$^2$, or greater than 30 J/m$^2$, or greater than 33 J/m$^2$, or at least 35 J/m$^2$, or at least 40 J/m$^2$, or from 5 to 50 J/m$^2$, or from 5 to 40 J/m$^2$, or from 5 to 35 J/m$^2$, or from 5 to 25 J/m$^2$, or from 5 to 15 J/m$^2$, or from 5 to 10 J/m$^2$, or from 5 to 9 J/m2, or from 9 to 40 J/m2, or from 9 to 35 J/m$^2$, or from 9 to 25 J/m$^2$, or from 9 to 15 J/m2, or from 10 to 40 J/m$^2$; or from 10 to 25 J/m$^2$, or from 10 to 15 J/m$^2$, or from 25 to 40 J/m$^2$.

In a preferred embodiment, the composition possesses both a low modulus and a high tear strength. This can be determined quantitatively as a ratio in dividing the strain energy release rate ($G_0$) value (in J/m$^2$) by the segment modulus (E) value (in MPa) of a film formed from the radiation curable composition. In an embodiment, the composition possesses such a ratio, expressed as $G_0/E$, in units of J/(m$^2$·MPa), of greater than 20, or greater than 25, or greater than 30, or greater than 35, or greater than 50, or greater than 60, or greater than 70, or greater than or equal to 75 or greater than 81, or greater than 90, or greater than 100, or greater than 150, or greater than 170; or from 20 to 70, or from 20 to 60, or from 20 to 50, or from 20 to 35, or from 20 to 30, or from 20 to 25, or from 25 to 70, or from 25 to 60, or from 25 to 50, or from 25 to 35, or from 25 to 30, or from 30 to 70, or from 30 to 60, or from 30 to 50, or from 30 to 35; or from 70-250, or from 75-250, or from 82-250, or from 82-200, or from 90-250, or from 90-200.

A second aspect of the current invention is a method for coating an optical fiber, comprising providing a glass optical fiber, preferably by drawing a glass optical fiber through a draw tower; applying a primary coating composition onto the surface of the glass optical fiber; optionally, imparting a dose of UV light sufficient to at least partially cure said primary coating composition; applying a secondary coating composition to the primary coating composition; exposing the primary coating composition and the secondary coating composition to at least one radiation source capable of emitting ultraviolet radiation to affect curing of said primary coating composition and said secondary coating composition, to form a cured primary coating on the surface of the optical fiber, and a cured secondary coating on the surface of the cured primary coating; wherein the primary coating composition is a composition according to any of the embodiments of the first aspect of the current invention.

A third aspect of the current invention is a coated optical fiber, the coated optical fiber comprising a glass core and a cladding layer in contact with and surrounding said glass core; and a coating portion, said coating portion further including a primary coating layer in contact with and surrounding said cladding layer; and a secondary coating layer in contact with and surrounding said primary coating layer. According to this third aspect, the primary coating layer is a cured product of a radiation curable composition according to any of the embodiments of the first aspect, and the primary and secondary coatings are applied and cured according to any of the embodiments of the second aspect.

According to an embodiment of the third aspect, the optical fiber comprises a core, a cladding, a primary coating contacting and surrounding the outer annular cladding region, and a secondary coating. According to some embodiments of the third aspect, the core comprises pure silica glass ($SiO_2$) or silica glass with one or more dopants that increase the index of refraction of the glass core relative to pure, undoped silica glass. Suitable dopants for increasing the index of refraction of the core include, without limitation, $GeO_2$, $Al_2O_3$, $P_2O_5$, $TiO_2$, $ZrO_2$, $Nb_2O_5$, $Ta_2O_5$, and/or combinations thereof.

The cladding layer may comprise pure silica glass ($SiO_2$), silica glass with one or more dopants which increase the index of refraction (e.g., $GeO_2$, $Al_2O_3$, $P_2O_5$, $TiO_2$, $ZrO_2$, $Nb_2O_5$ and/or $Ta_2O_5$), such as when the cladding is "up-doped," or silica glass with a dopant which decreases the index of refraction, such as fluorine, such as when the inner cladding is "down-doped", so long as the maximum relative refractive index [$\Delta_{1MAX}$] of the core is greater than the maximum relative refractive index [$\Delta_{4MAX}$] of the cladding. According to one embodiment, the cladding is also pure silica glass.

According to some embodiments of the third aspect, the primary coating is a typical primary coating that has an in-situ (or on-fiber) tensile modulus of less than 1.5 MPa, or less than 1.0 MPa, or less than 0.6 MPa, or less than 0.5 MPa, or less than 0.3 MPa, or from 0.15 to 0.8 MPa, or from 0.15 to 0.8 MPa, and in other embodiments less than 0.2 MPa. Methods for describing in-situ modulus are well-known in the art and are described in, inter alia, U.S. Pat. Nos. 7,171,103 and 6,961,508, each of which is assigned to DSM IP Assets B.V. In an embodiment, the cured primary coating has an in-situ glass transition temperature of less than −35° C., or less than −40° C., or less than −45° C., and in other embodiments not more than −50° C. A primary coating with a low in-situ modulus reduces the microbending which is the coupling mechanism between the modes propagating in the fiber. A low in-situ glass transition temperature ensures that the in-situ modulus of the primary coating will remain low even when the fiber is deployed in very cold environments. In a preferred embodiment, the primary coating according to the third aspect also possesses high tear strength values, such as a tear strength $G_0$ of at least 5 J/m$^2$, or at least 9 J/m$^2$, or at least 10 J/m$^2$, or at least 15 J/m$^2$, or at least 25 J/m$^2$, or greater than 28 J/m$^2$, or greater than 30 J/m$^2$, or greater than 33 J/m$^2$, or at least 35 J/m$^2$, or at least 40 J/m$^2$, or from 5 to 50 J/m$^2$, or from 5 to 40 J/m$^2$, or from 5 to 35 J/m$^2$, or from 5 to 25 J/m$^2$, or from 5 to 15 J/m$^2$, or from 5 to 10 J/m$^2$, or from 5 to 9 J/m2, or from 9 to 40 J/m2, or from 9 to 35 J/m$^2$, or from 9 to 25 J/m$^2$, or from 9 to 15 J/m2, or from 10 to 40 J/m$^2$; or from 10 to 25 J/m$^2$, or from 10 to 15 J/m$^2$, or from 25 to 40 J/m$^2$. It is also beneficial that the coated optical fiber maintain both a low modulus as well as high tear strength, so in a preferred embodiment, the coated optical fiber according to the third aspect possesses a ratio of tear strength to in-situ modulus (in units of J/(m²·MPa)) of greater than 30, or greater than 60, or greater than 70, or greater than or equal to 75 or greater than 81, or greater than 90, or greater than 100, or greater than 150, or greater than 170; or greater than 200; or from 70-300, or from 75-300, or from 82-300, or from 82-200, or from 90-250, or from 90-200.

The primary coating maintains adequate adhesion to the glass fiber during thermal and hydrolytic aging, yet (if needed) is capable of being strippable therefrom for splicing purposes. The primary coating typically has a thickness in the range of 20 to 50 µm (e.g., about 25 or 32.5 µm), thinner thickness in the range of 15 to 25 µm for 200 µm fibers. In other embodiments, the primary coating preferably has a thickness that is less than about 40 µm, more preferably between about 20 to about 40 µm, most preferably between about 20 to about 30 µm.

The secondary coating is in contact with and surrounds the primary coating. The secondary coating is, for example, the polymerization product of a coating composition whose molecules become highly crosslinked when polymerized. The secondary coating, according to an embodiment, may possess an in-situ tensile modulus of greater than 800 MPa, or greater than 1110 MPa, or greater than 1300 MPa, or greater than 1400 MPa, or greater than 1500 MPa. A secondary coating with a high in-situ modulus reduces the microbending which is the coupling mechanism between the modes propagating in the fiber.

According to other embodiments, the secondary coating has a high in-situ modulus (e.g., greater than about 800 MPa at 25° C.) and a high $T_g$ (e.g., greater than about 50° C.). In other preferred embodiments, the in-situ secondary modulus is between about 1000 MPa and about 8000 MPa, more preferably between about 1200 MPa and about 5000 MPa, and most preferably between about 1500 MPa and about 3000 MPa. The in-situ $T_g$ of the secondary coating is preferably between about 50° C. and about 120° C., more preferably between about 50° C. and about 100° C. In an embodiment, the secondary coating has a thickness that is less than about 40 µm, more preferably between about 20 to about 40 µm, most preferably between about 20 to about 30 µm.

Suitable materials for use in outer (or secondary) coating materials, as well as considerations related to selection of these materials, are well known in the art and are described in, for example, U.S. Pat. Nos. 4,962,992 and 5,104,433 to Chapin. As an alternative to these, high modulus coatings have also been obtained using low oligomer content coating systems, as described in U.S. Pat. No. 6,775,451 to Botelho et al., and U.S. Pat. No. 6,689,463 to Chou et al. In addition, non-reactive oligomer components have been used to achieve high modulus coatings, as described in U.S. Application Publ. No. 20070100039 to Schissel et al. The secondary coating may also include an ink, as is well known in the art. In such case, the secondary coating may be referred to as a "colored secondary coating."

The coated optical fiber may alternatively comprise one or more additional layers disposed on the secondary layer. Most notably, such layers include a standalone "ink" layer which is applied and cured separately from the secondary coating. Other multi-layer coating systems are known and are disclosed in, e.g., WO2017173296.

It is known in the art how to formulate typical optical fiber coating for primary and secondary coatings for fiber as described above, as well as for ink and matrix materials for curing using broadband UV lamps. A good discussion of this technology and associated chemistry and test methods can be found in sections 4.6 to the end of chapter 4 in the textbook, "Specialty Optical Fibers Handbook" by A. Mendez and T. F. Morse, © Elsevier Inc. 2007, published by Elsevier.

Any optical fiber type may be used in embodiments of the third aspect of present invention. In a preferred embodiment, however, the coated optical fiber possesses a mode-field diameter from 8 to 10 µm at a wavelength of 1310 nm, or a mode-field diameter from 9 to 13 µm at a wavelength of 1550 nm, and/or an effective area between 20 and 200 µm². Such fibers may be single mode and/or large-effective area fibers, given the expected demand for coating processes for these fibers that utilize higher line or processing speeds. However, other fiber types, such as multimode fibers, may be used as well.

A fourth aspect of the invention is an optical fiber cable, wherein the optical fiber comprises at least one optical fiber according to the third aspects of the invention, and/or wherein the optical fiber is the cured product of a composition according to the first aspect of the invention, and/or wherein the optical fiber was coated according to the second aspect of the invention.

Improved compositions (and the coated optical fibers produced therefrom) of the current invention can be formulated via the selection of components specified above herein, and further readily tuned by those of ordinary skill in the art to which this invention applies by following the formulation guidelines herein, as well as by extrapolating from the general approaches taken in the embodiments illustrated in the examples below. The following such examples further illustrate the invention but, of course, should not be construed as in any way limiting its scope.

EXAMPLES

These examples illustrate embodiments of the instant invention. Table 1 describes the various components of the compositions used in the present examples. Table 2 describes various further aspects of the oligomers created from the reagents in Table 1, the synthesis for which is described further below. Table 3 indicates test results for entire formulations created from the components described in Table 1 and the oligomers characterized in Table 2.

TABLE 1

Formulation Components

| Component | Function in formula | Chemical Descriptor | Supplier/ Manufacturer |
|---|---|---|---|
| SR489 (TDA) | Diluent | Tridecyl acrylate | Arkema |
| SR351 (TMPTA) | Diluent | Trimethylolpropane triacrylate | Arkema |

TABLE 1-continued

Formulation Components

| Component | Function in formula | Chemical Descriptor | Supplier/Manufacturer |
|---|---|---|---|
| SR504 (ENPA) | Diluent | Ethoxylated (4) nonyl phenol acrylate | Arkema |
| VC | Diluent | N-Vinyl caprolactam | BASF |
| Miramer M166 (ENPA8) | Diluent | Ethoxylated (8) nonyl phenol acrylate | Miwon |
| Miramer M3130 (TMPTA3) | Diluent | Ethoxylated (3) trimethylolpropane triacrylate | Miwon |
| BAPO | Photoinitiator | Phenyl bis(2,4,6-trimethylbenzoyl) phosphine oxide | IGM Resins |
| TPO | Photoinitiator | Diphenyl (2,4,6-trimethylbenzoyl) phosphine oxide | IGM Resins |
| Irganox 1035 | Additive | Thiodiethylene bis[3-(3,5-di-tert-butyl-4-hydroxyphenyl)propionate] | BASF |
| Acrylic silane | Additive | Trimethoxysiliylpropyl acrylate | Momentive |
| TEOS | Additive | Tetraethoxy silane | Alfa Aesar |
| Acclaim 6320N | Oligomer | Copolymer triol of propylene oxide and ethylene oxide, theoretical Mw 6000 | Covestro |
| Acclaim 8200 | Oligomer | polypropylene glycol, theoretical Mw 8000 | Covestro |
| Desmodur T-100 (TDI) | Oligomer | 2,4-Tolylene diisocyanate | Covestro |
| Acrylic acid | Oligomer | Acrylic Acid | VWR |
| BHT | Oligomer | tert-Butylhydroquinone | VWR |
| DBTDL | Oligomer | Dibutyltin dilaurate | OMG Borchers |
| HEA | Oligomer | 2-Hydroxyethyl acrylate | BASF |
| HEMA | Oligomer | 2-hydroxyethyl methacrylate | Sigma Aldrich |

Synthesis of Oligomers

The oligomers used herein were prepared via well-known methods in the art to which this invention applies in TDA as reactive diluent (which itself was used in 25% by weight). After charging the diisocyanate, the catalyst (DBTDL), and the stabilizers (BHT and acrylic acid) in the reactor, the hydroxy-functional compounds were added subsequently after completion of the previous urethane formation.

Oligomer 1: For the HEA-functionalized triol oligomer 1, 6 mol eq. of diisocyanate (Desmodur T-100), 3 mol eq. of mono hydroxy-functional compound (HEA), 3 mol eq. of bis hydroxy-functional compound (diol) Acclaim 8200, and 1 mol eq. of tris hydroxy-functional compound (triol) Acclaim 6320N (C) were used. The "ideal" structure is:

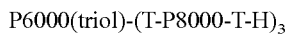

wherein "P6000(triol)" represents the reaction product of the polyol Acclaim 6320N, through which the junction point of the oligomer was located; "T" represents the reaction product of the diisocyanate compound TDI; "H" represents the reaction product of the acrylate compound HEA with a polymerizable acrylate group; and "P8000" represents the reaction product of the Acclaim 8200 polyol. The suffix 3 on "(T-P8000-T-H)" represents that the oligomer possesses three distinct arms branching from the junction point along the triol core. As can be seen, this oligomer possesses three polymerizable acrylate endgroups. Further characterizations of this oligomer are presented in Table 2. An SEC plot of oligomer 1, which was obtained via the experimental method described elsewhere herein, below, is depicted in FIG. 1.

Oligomer 2: For the HEMA-functionalized triol oligomer 2, 6 mol eq. of diisocyanate (Desmodur T-100), 3 mol eq. of mono hydroxy-functional compound (HEMA), 3 mol eq. of bis hydroxy-functional compound (diol) Acclaim 8200, and 1 mol eq. of tris hydroxy-functional compound (triol) Acclaim 6320N (C) were used. The "ideal" structure is:

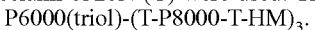

wherein "P6000(triol)" represents the reaction product of the polyol Acclaim 6320N, through which the junction point of the oligomer was located; "T" represents the reaction product of the diisocyanate compound TDI; "HM" represents the reaction product of the methacrylate compound HEMA with a polymerizable methacrylate group; and "P8000" represents the reaction product of the Acclaim 8200 polyol. The suffix 3 on "(T-P8000-T-H)" represents that the oligomer possesses three distinct arms branching from the junction point along the triol core. As can be seen, this oligomer possesses three polymerizable methacrylate endgroups. Further characterizations of this oligomer are presented in Table 2.

Figure 2:
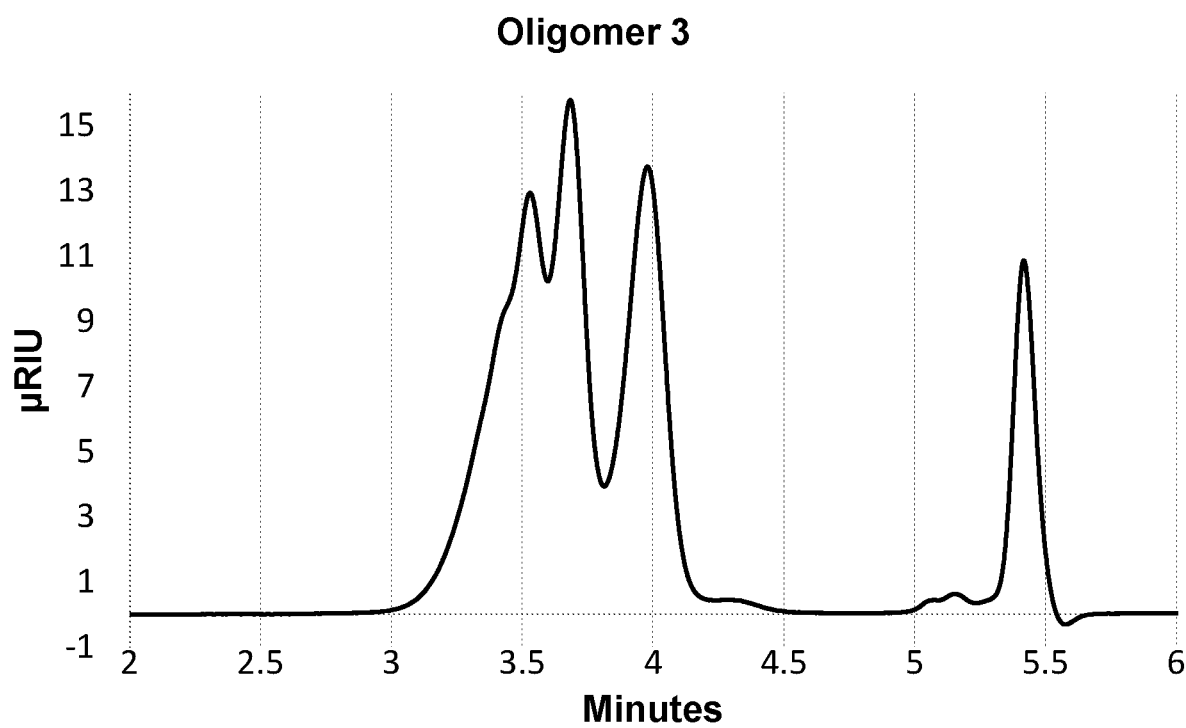
FIG. 2 depicts an SEC plot of an oligomer (oligomer 3) used in the examples as shown herein.

Oligomer 3: For the lower molecular weight linear HEA-functionalized diol oligomer 3, 3 mol eq. of diisocyanate (Desmodur T-100), 2 mol eq. of mono hydroxy-functional compound (HEA), and 2 mol eq. of bis hydroxy-functional compound (diol) Acclaim 8200 were used. The "ideal" structure is:

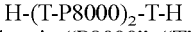

wherein "P8000", "T", and "H" are defined in the description with respect to oligomers 1 and 2, above. The suffix 2 on "(T-P8000)" represents that the oligomer possesses two distinct linear blocks containing the reaction product of the P8000 diol. As can be seen, this oligomer is linear with two arms emanating from the core and possesses two polymerizable acrylate endgroups. Further characterizations of this oligomer are presented in Table 2. An SEC plot of oligomer 3, which was obtained via the experimental method described elsewhere herein, below, is depicted in FIG. 2.

Figure 3:
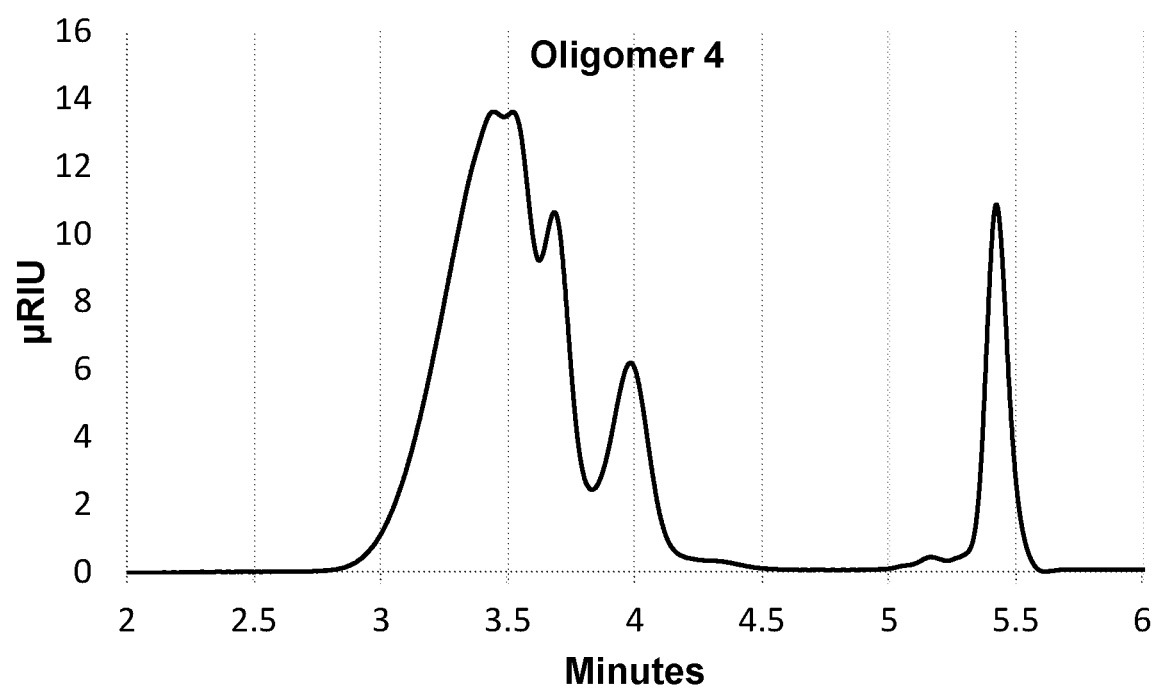
FIG. 3 depicts an SEC plot of an oligomer (oligomer 4) used in the examples as shown herein.

Oligomer 4: For the higher molecular weight linear HEA-functionalized diol oligomer 4, 5 mol eq. of diisocyanate (Desmodur T-100), 2 mol eq. of mono hydroxy-functional compound (HEA), and 4 mol eq. of bis hydroxy-functional compound (diol) Acclaim 8200 were used. The "ideal" structure is:

H-(T-P8000)$_4$-T-H wherein "P8000", "T", and "H" are as defined in the description with respect to oligomers 1 and 2, above. The suffix 4 on "(T-P8000)" represents that the oligomer possesses four distinct linear blocks containing the reaction product of the P8000 diol. As can be seen, this oligomer is linear with two arms emanating from the core and possesses two polymerizable acrylate endgroups. Further characterizations of this oligomer are presented in Table 2. An SEC plot of oligomer 4, which was obtained via the experimental method described elsewhere herein, below, is depicted in FIG. 3.

Oligomer Characterization

Each of the oligomers for which the synthesis has been described above was further characterized according to several parameters evaluated in the experiments listed below. For each oligomer, the ideal structure, i.a, respective functionality, number of arms, chain length between the junction point and the most distal termination point, and the total theoretical oligomer molecular weight was determined with respect to the ideal structure associated therewith. Functionality represents the number of (meth)acrylic groups on the oligomer, wherein the number of arms would be readily apparent to the person having ordinary skill in the art to which this invention pertains by referencing the ideal structure. Chain length of the longest arm (theoretical; depicted in Table 2 as "Theo. Chain Length Longest Arm") was determined by adding the atomic weight of all reactants used to create the particular arm from the junction point to the most distal termination point in the ideal oligomer structure. For oligomers endcapped with an —OH group (via a reactant such as 2-ethyl hexanol) instead of an HEA group (not shown), this arm would typically be represented as the longest arm because the molecular weight of, e.g., 2-ethyl hexanol (130.23 g/mol) is greater than HEA (116.12 g/mol). Total theoretical oligomer molecular weight (described as "Mn, theo" in Table 2) was determined by summing the atomic weight of all the atoms in the ideal structure of each oligomer. Chain length and Mn, theo are reported in kilodaltons (kDa), rounded to the nearest 0.1 kDa or 0.01 kDa as specified.

Each oligomer created herein and described above was then analyzed via SEC per the method described in the following section to determine the created oligomer's number average molecular weight (Mn), weight average molecular weight (Mw), and z-average molecular weight (Mz). Details on each of these parameters is found in *Polymer Molecular Weight Distribution and Definitions of MW Averages*; Agilent Technologies, Apr. 30, 2015; 5990-7890EN; (https://www.agilent.com/cs/library/technicaloverviews/Public/5990-7890EN.pdg). Finally, other values were derived therefrom, including the measured chain length of the longest arm (described in Table 2 as "Exp. Chain Length Longest Arm") and the ratio of the measured Mz to Mn values. Where, as in all examples in Table 2, every arm of an oligomer possessed a theoretically equivalent structure, the "Exp. Chain Length Longest Arm" was determined by dividing Mn by the number of arms. The values for all parameters discussed herein are reported in Table 2 as appropriate.

SEC Characterization

With the various reactive oligomers having been synthesized, they were then evaluated according to the size exclusion chromatography (SEC) method in accordance with ASTM: D5296-11: "Standard Test Method for Molecular Weight Averages and Molecular Weight Distribution of Polystyrene by High Performance Size-Exclusion Chromatography," ASTM International, West Conshohocken, Pa., (2011). Additionally, ASTM norm D 5226-98: "Standard Practice for Dissolving Polymer Materials," ASTM International, West Conshohocken, Pa., (2010), was used to facilitate the definition of solvents which are appropriate for polymer analysis.

Specifically, all Size Exclusion Chromatography measurements were performed Waters APC (Advanced Polymer Chromatography) system with RI detector, a Wyatt microDawn multi-angle light scattering instrument and a Wyatt microViscoStar capillary-bridge differential viscometer. For chromatographic separation, a column: 4.6×76 mm, Acquity APC XT 450 2.5 µm, 125 2.5 µm, 45 1.7 µm was used. Detectors and columns were operated at 40° C. Prior to conducting SEC, each respective polymer was dissolved at a concentration ranging from 1.0 to 1.5 mg/ml in tetrahydrofuran (THF) containing 1 wt. % of acetic acid. This THE solution was also used as an eluent in SEC analysis at a flow rate of 0.5 ml/min.

With the dissolution complete, the molar mass and molar mass distribution were then determined with the above-referenced triple detection method using the refractive index, differential viscosity and right-angle light scattering signals. For a calculation of molecular weight averages and molar mass distribution, a refractive index increment (dn/dc) of around 0.07 ml/g was used. Specifically, the dn/dc values for Oligomers 1-4 were determined to be 0.0695, 0.0708, 0.0780, and 0.0792, respectively. The refractive index increment and molecular mass averages, as well as the molar mass distributions were determined by integration of the whole refractive index chromatograms. An IV-DP signal was additionally used to set the integration limit. Recoveries of the samples from columns varied between 95 and 105%, which are the typical of values obtained in size-exclusion chromatography.

Using the above-prescribed method, values Mn, Mw, and Mz were recorded and reported.

TABLE 2

| | Oligomer Characterization | | | |
|---|---|---|---|---|
| | Oligomer 1 | Oligomer 2 | Oligomer 3 | Oligomer 4 |
| Ideal Structure | P6000(triol)-(T-P8000-T-H)$_3$ | P6000(triol)-(T-P8000-T-HM)$_3$ | H-(T-P8000)$_2$-T-H | H-(T-P8000)$_4$-T-H |
| Functionality | 3 | 3 | 2 | 2 |
| Number of Arms | 3 | 3 | 2 | 2 |
| Theo. Chain Length Longest Arm | 10.5 | 10.5 | 8.4 | 16.6 |

TABLE 2-continued

Oligomer Characterization

|   | Oligomer 1 | Oligomer 2 | Oligomer 3 | Oligomer 4 |
|---|---|---|---|---|
| Mn, theo | 31.39 | 31.43 | 16.75 | 33.10 |
| Mn | 11.5 | 10.2 | 7.0 | 9.8 |
| Exp. Chain Length Longest Arm | 3.8 | 3.4 | 3.5 | 4.9 |
| Mw | 28.8 | 2.6 | 10.1 | 16.0 |
| Mz | 65.7 | 60.5 | 14.2 | 23.3 |
| Mz/Mn | 5.73 | 5.95 | 2.02 | 2.37 |

Formulations 1-10

Using one or more of the oligomers described above and characterized in Table 2, each of the formulations described in Table 3 below was prepared by mixing a 100 g sample in a 100 ml mixing cup suitable for use with a SpeedMixer™. Specifically, the photoinitiator was added to the amount of oligomer specified in Table 3 below, followed by the prescribed amounts of monomer(s) resulting in 100 g in total. The mixture was then premixed by hand to ensure the oligomer was well mixed into the monomers used. The cup was then closed and vigorously mixed in a SpeedMixer™ DAC150FVZ at 3500 rpm for 3 mins. After this, it was stopped and heated to 55° C. in an oven and maintained at this temperature for about 1 hour to ensure complete dissolution of all components. Finally, the sample was removed from the oven and mixed again for 30 additional seconds in the SpeedMixer again via the same method.

These formulations were tested according to the methods described below for determining each sample's initial viscosity, segment modulus (E), tear strength ($G_0$), and $G_0/E$ ratios, respectively. Values for viscosity were rounded to the nearest 0.01 pascal second, while segment modulus values are presented herein as rounded to two or three decimal places. Finally, $G_0$ values are calculated and presented herein as rounded to one decimal place. Values for these measured characteristics are reported in Table 3 below.

Viscosity

The viscosity is measured using Anton Paar Rheolab QC. The instrument was set up for the conventional Z3 system, which was used. For each measurement, samples in the amount of 14.7±0.2 g were loaded into a disposable aluminum cup. The sample in the cup was examined and if upon visual inspection it was determined to contain bubbles, the sample and cup was either subjected to centrifugation or allowed to sit long enough so that the bubbles would escape from the bulk of the liquid. Bubbles appearing at the top surface of the liquid were considered to be acceptable.

Next, the bob was gently loaded into the liquid in the measuring cup, after which the cup and bob were installed in the instrument. The sample temperature was allowed to equilibrate with the temperature of the circulating liquid (which itself was maintained at 25 degrees Celsius) by waiting five minutes. Then, the rotational speed was set to a certain value in order to produce the desired shear rate of 50 $sec^{-1}$.

After this, measurement readings were obtained. The instrument panel displayed a viscosity value, and if the viscosity value varied only slightly (less than 2% relative variation) for 15 seconds, the measurement was ceased. If greater than 2% relative variation was observed, the sample was allowed to equilibrate for an additional 5 minutes whereupon testing was resumed. If, upon the additional equilibration period, the sample variability remained, the shear rate would be modified according to well-known methods in the art to which this invention applies to more accurately capture the sample's viscous properties. The results reported represented the average viscosity values of three separate test samples. Unless otherwise noted, the values were recorded as expressed in pascal seconds (Pa s). The results for each example are reported in Table 3 below.

Film Sample Preparation for all Measurements

The sample was cured with a 1 $J/cm^2$ UV-dose of Conveyor Fusion Unit Model DRS-10/12 QN, UV-lamp system having as lamps 1600M radiator (D-bulb, power 600 W/inch, which equals 240 W/cm) fitted with R500 reflector. The UV-dose was then measured with an international Light 390 radiometer. The measured UV peak irradiance for 1 $J/cm^2$ condition is 8.1 $W/cm^2$.

Tensile Strength, Elongation, and Modulus Test Method

The method for determining segment modulus as used herein is found in EP2089333B1, assigned to DSM IP Assets B.V., which is hereby incorporated by reference in its entirety. The tensile properties (tensile strength, percent elongation at break, and modulus) of cured samples are determined using MTS Criterion™ Model 43.104. Samples are prepared for testing by curing a 150 m film of the material using a Fusion UV processor. Samples are cured at 1.0 $J/cm^2$ in a nitrogen atmosphere. Test specimens having a width of 1.27 cm (0.5 inches) and a length of 12.7 cm (5 inches) are cut from the film. The exact thickness of each specimen is measured with a micrometer.

Due to these relatively soft coatings (e.g., those with a modulus of less than about 10 MPa), the coating is drawn down and cured on a glass plate and the individual specimens cut from the glass plate with a scalpel. A 0.9 kg (2-lb) load cell is used in the Instron and modulus is calculated at 2.5% elongation with a least-squares fit of the stress-strain plot. Cured films are conditioned at 23.0±0.1° C. and 50.0±0.5% relative humidity for a minimum of 16-24 hours prior to testing.

For testing specimens, the gage length is 5.1 cm (2-inches) and the crosshead speed is 2.54 cm/minute (1 inch/minute). All testing is done at a temperature of 23.0±0.1° C. and a relative humidity of 50.0±0.5%. All measurements are determined from the average of at least 6 test specimens.

Values for segment modulus (E) were recorded for each example and are reported in Table 3 below.

Measurement of Strain Energy Release Rate or Tear Strength ($G_0$)

The strain energy release rate $G_0$ was measured according to the International Standard norm ISO 816 (second edition 1983-12-01) "Rubber, vulcanized: Determination of tear strength of small test pieces (Delft test pieces)." The test pieces used were prepared in accordance with ISO 816. The length between the grips was 20 mm. The thickness (d) was 0.15 mm (6 mil) and was measured by means of a Mitutoyo micrometer with a resolution of 0.001 mm. The cure sample was cut using a die from ASTM D1822 type L from MS Instrument Company Inc., and the slit length (b) was 4.70 mm of initial crack with a fixed sample width of 9.1 mm and length 60 mm.

As for equipment used, tests were performed on an RSA-G2 machine from TA Instruments. The force sensor used was an FRT Transducer accommodating a maximum of 3500 grams of force (34.32 N), which was connected to a linear air bearing motor having a frequency up to 100 Hz and an amplitude ±1.5 mm. Elongation was measured with clamps at a rate of roughly 0.01 mm/s with data points being taken each second. The test speed was a Hencky strain rate of $4.5e^{-4}$/s. The test was conducted at a temperature of 23±2° C. and a relative humidity of 50±10%. All the equipment used was calibrated in accordance with ISO 9001.

For each example reported, from five to eight specimens were used. The reported $G_0$ value was the average value for these samples.

The strain energy release rate $G_0$ is the energy required per 1 m² crack in the above described test specimen of a cured primary coating initially containing a small crack equal to slit length b as defined in ISO 816. $G_0$ is then calculated as follows:

$$G_0 = \frac{\left(\frac{Fbreak}{B \cdot d} \cdot C \cdot \sqrt{\pi \frac{b}{2}}\right)^2}{E}$$

wherein Fbreak is the force at break, b is the slit length, d is the thickness and B the width of the test piece, and E is the segment modulus at a test speed of 2.54 cm/minute (1 inch/minute) as calculated from 2.5% elongation with a least-squares fit of the stress-strain plot in test method as described in "the determination of the stress/strain curve from a uniaxial tensile test" and wherein C defines the sample geometry as follows $$C = \sqrt{\frac{1}{\cos\frac{\pi b}{2B}}}$$

The $G_0$ values for each sample (reported in units of J/m²) tested were then recorded and are reported in Table 3 below.

Ratio of Tear Strength ($G_0$) to Segment Modulus (E)

First, the ratios of tear strength ($G_0$) and Segment Modulus were determined per the methods described elsewhere herein, above. Then, the ratio of these two values was determined by dividing the $G_0$ value for a particular example by its E value. Units are expressed in J/(m²·MPa). Values for each example were calculated and are reported in Table 3 below.

Table 3

| Formulations 1-10. All amounts listed in parts by weight. | | | | | | | | | | |
|---|---|---|---|---|---|---|---|---|---|---|
| Component | 1 | 2* | 3* | 4 | 5 | 6 | 7 | 8 | 9* | 10* |
| Oligomer 1 | 60.00 | | | 70.00 | 52.50 | 52.50 | | | | |
| Oligomer 2 | | | | | | | 70.00 | 35.00 | | |
| Oligomer 3 | | 60.00 | | | 17.50 | | | | 70.00 | |
| Oligomer 4 | | | 60.00 | | | 17.50 | | 35.00 | | 70.00 |
| TDA | 19.70 | 19.70 | 19.70 | | | | | | | |
| TMPTA | 0.50 | 0.50 | 0.50 | | | | | | | |
| TMPTA3 | | | | 1.50 | 1.50 | 1.50 | 1.50 | 1.50 | 1.50 | 1.50 |
| ENPA | 7.50 | 7.50 | 7.50 | | | | | | | |
| ENPA8 | | | | 13.50 | 13.50 | 13.50 | 13.50 | 13.50 | 13.50 | 13.50 |
| VC | 10.0 | 10.0 | 10.0 | 12.00 | 12.00 | 12.00 | 12.00 | 12.00 | 12.00 | 12.00 |
| TPO | 1.20 | 1.20 | 1.20 | | | | | | | |
| BAPO | | | | 2.00 | 2.00 | 2.00 | 2.00 | 2.00 | 2.00 | 2.00 |
| Irganox 1035 | 0.60 | 0.60 | 0.60 | 0.25 | 0.25 | 0.25 | 0.25 | 0.25 | 0.25 | 0.25 |
| Acrylic silane | 0.50 | 0.50 | 0.50 | 0.50 | 0.50 | 0.50 | 0.50 | 0.50 | 0.50 | 0.50 |
| TEOS | | | | 0.25 | 0.25 | 0.25 | 0.25 | 0.25 | 0.25 | 0.25 |
| Total | 100 | 100 | 100 | 100 | 100 | 100 | 100 | 100 | 100 | 100 |
| Viscosity (Pa·s, 25° C.) | 2.31 | 2.10 | 6.65 | 7.17 | 6.64 | 8.69 | 5.62 | 9.56 | 4.68 | 15.60 |
| Segment Modulus ("E") (MPa) | 0.198 | 0.29 | 0.293 | 0.41 | 0.45 | 0.36 | 0.33 | 0.24 | 0.51 | 0.22 |
| $G_0$ (J/m²) | 34.5 | 23.6 | 20.6 | 34.5 | 34.3 | 36.1 | 33.2 | 28.3 | 33 | 14.9 |
| $G_0$/E | 174 | 81 | 70 | 84 | 75 | 98 | 99 | 116 | 66 | 66 |

*Indicates comparative example.

Discussion of Results

As can be seen, compositions according to various aspects of the present invention tend to possess properties which would make them especially suitable for use in optical fiber coating applications, and in particular as optical fiber primary coatings, given their tear strength values and/or ratio of tear strength to segment modulus ($G_0/E$). Specifically, it is shown that compositions consisting of a reactive oligomer having three arms exhibit a significantly higher tear strength than those consisting of reactive oligomers with two arms. This is true regardless of whether the chain length of the longest arm on the two-armed oligomer is shorter or longer than that of the three-armed oligomer.

Unless otherwise specified, the term wt. % means the amount by mass of a particular constituent relative to the entire liquid radiation curable composition into which it is incorporated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described in detail and with reference to specific embodiments thereof, it will be apparent to one of ordinary skill in the art that various changes and modifications can be made therein without departing from the spirit and scope of the claimed invention.

What is claimed is:

1. A radiation curable composition for use as an optical fiber primary coating comprising, consisting of, or consisting essentially of:
   an oligomer component;
   a diluent component;
   a photoinitiator component; and
   optionally, an additive component;
   wherein the oligomer component comprises, consists essentially of, or consists of a reactive urethane oligomer having at least three arms each having a most distal termination point and bound together at a single junction point, wherein at least one arm comprises the reaction product of
   a polyol;
   a polyisocyanate; and
   an isocyanate-reactive (meth)acrylate;
   wherein the reactive urethane oligomer possesses a number average molecular weight (Mn) and a Z-average molecular weight (Mz),
   wherein the Mn is greater than or equal to about 10 kilodaltons (kDa); and
   Mz/Mn is greater than or equal to 4.5, or from 4.5 to 15, or from 4.5 to 10, or from 4.5 to 8, or from 4.5 to 6;
   wherein Mn and Mz are measured by a size exclusion chromatography (SEC) method.

2. The radiation curable composition of claim 1, wherein the reactive urethane oligomer has an average (meth)acrylate functionality of between 1.5 and 4.2.

3. The radiation curable composition of claim 1, wherein a theoretical chain length between the junction point and the most distal termination point along three arms of the reactive urethane oligomer is at least 3 kDa.

4. The radiation curable composition of claim 1, wherein the reactive urethane oligomer or oligomer component is present, relative to the weight of the entire composition, in an amount of less than 65 wt. %.

5. The radiation curable composition of claim 1, wherein at least one arm of the reactive urethane oligomer comprises the reaction product of a polyol, a polyisocyanate, and a monohydric alcohol not possessing a (meth)acrylic moiety.

6. The radiation curable composition of claim 1, wherein the additive component comprises an adhesion promoter.

7. The radiation curable composition of claim 1, wherein the reactive urethane oligomer contains exactly three arms.

8. The radiation curable composition of claim 1, wherein the oligomer component comprises, consists of, or consists essentially of a reactive urethane oligomer having a theoretical molecular weight of at least 20 kilodaltons (kDa).

9. The radiation curable composition of claim 1, wherein the junction point of the reactive urethane oligomer is located at a reaction product of a trifunctional core compound.

10. The radiation curable composition of claim 9, wherein the trifunctional core compound comprises, consists essentially of, or consists of a polyether triol.

11. The radiation curable composition of claim 10, wherein the polyether triol possesses a theoretical molecular weight of at least 3 kDa, or at least 5 kDa, or at least 6 kDa, or at least 9 kDa, or between 5 kDa and 20 kDa, or between 6 kDa and 15 kDa.

12. The radiation curable composition of claim 9, wherein the trifunctional core compound comprises, consists essentially of, or consists of a triisocyanate.

13. The radiation curable composition of claim 1, wherein the oligomer component comprises, consists essentially of, or consists of reactive oligomer(s) according to the following structure (I):

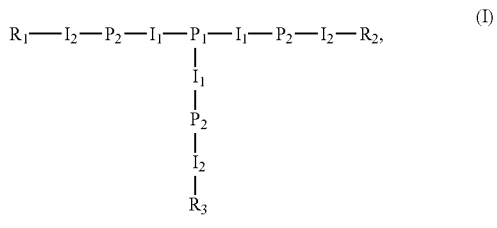

(I)

wherein

P$_1$ represents the reaction product of a polyether triol;

P$_2$ represents the reaction product of a polyether diol;

I$_1$ and I$_2$ are the same or are different and each represents the reaction product of a di-isocyanate compound;

R$_1$, R$_2$, and R$_3$ are the same or are different and each represents the reaction product of: (a) a hydroxy-functional (meth)acrylate, or (b) a C$_1$-C$_{18}$ monohydric alcohol not possessing a (meth)acrylic moiety.

14. The radiation curable composition of claim 13, wherein a molar ratio of P$_1$:(I$_1$+I$_2$):P$_2$:(R$_1$+R$_2$+R$_3$) is from approximately 1:6:3:3 to 1:12:9:3, or a molar ratio of P$_2$:(I$_1$+I$_2$):(R$_1$+R$_2$+R$_3$) is from 0.8:1.5:1 to 4:5:1.

15. The radiation curable composition of claim 1, wherein the oligomer component comprises, consists essentially of, or consists of reactive oligomer(s) according to the following structure (II):

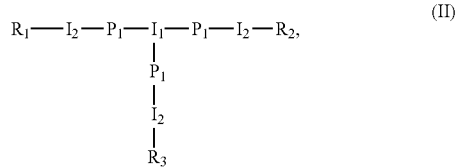

(II)

wherein I$_1$ represents the reaction product of a triisocyanate compound;

P$_1$ represents the reaction product of a polyether polyol, preferably a polyether diol;

I$_2$ represents the reaction product of a polyisocyanate compound, preferably a diisocyanate; and R$_1$, R$_2$, and R$_3$ are the same or are different and at least one represents the reaction product of: (a) a hydroxy-functional (meth)acrylate or (b) a C$_1$-C$_{18}$ monohydric alcohol not possessing a (meth)acrylic moiety.

16. The radiation curable composition of claim 1, wherein the oligomer component comprises, consists essentially of, or consists of reactive oligomer(s) according to the following structure (III):

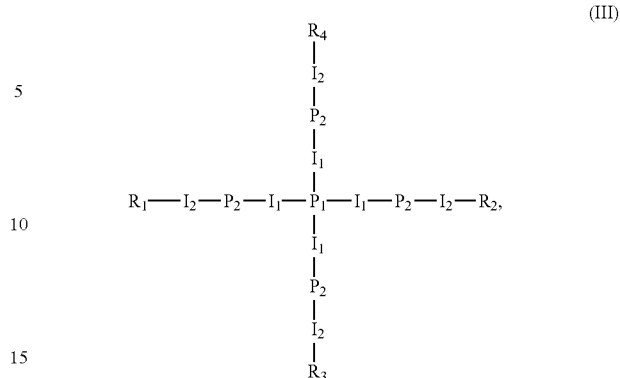

(III)

wherein P$_1$ represents the reaction product of a polyether tetraol;

P$_2$ represents the reaction product of a polyether diol;

I$_1$ and I$_2$ are the same or are different and each represents the reaction product of a di-isocyanate compound; and R$_1$, R$_2$, R$_3$ and R$_4$ are the same or are different and at least one represents the reaction product of: (a) a hydroxy-functional (meth)acrylate or (b) a C$_1$-C$_{18}$ monohydric alcohol not possessing a (meth)acrylic moiety.

17. The radiation curable composition of claim 1, wherein the oligomer component comprises, consists essentially of, or consists of reactive oligomer(s) according to the following structure (IV):

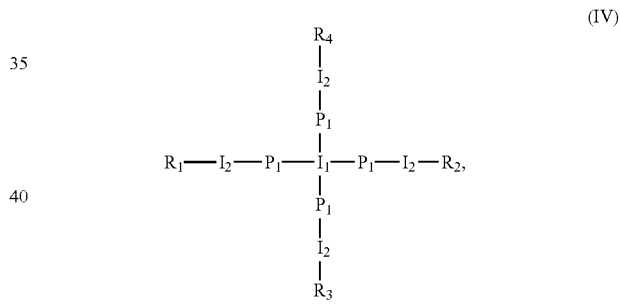

(IV)

wherein I$_1$ represents the reaction product of tetraisocyanate compound;

P$_1$ represents the reaction product of a polyether diol;

I$_2$ represents the reaction product of a di-isocyanate compound; and

R$_1$, R$_2$, R$_3$ and R$_4$ are the same or are different and at least one represents the reaction product of: (a) a hydroxy-functional (meth)acrylate or (b) a C$_1$-C$_{18}$ monohydric alcohol not possessing a (meth)acrylic moiety.

18. The radiation curable composition of claim 1, wherein the reactive urethane oligomer comprises an experimental chain length from 2.5 kDa to 20 kDa; wherein experimental chain length is the Mn of the reactive oligomer divided by the number of arms.

19. The radiation curable composition of claim 1, wherein the polyol comprises, consists essentially of, or consists of polypropylene glycol and/or a copolymer of propylene oxide and ethylene oxide, wherein the polyol or polyols each possess a theoretical molecular weight from 3,000 to 30,000 g/mol.

20. The radiation curable composition of claim 1, wherein the polyisocyanate comprises, consists essentially of, or consists of isophorone diisocyanate, 2,4-isomer toluene diisocyanate, 4,4'-methylenedicyclohexyl diisocyanate, 1,5-pentane diisocyanate, 2,2,4-trimethyl-hexamethylene diisocyanate, 2,4,4-trimethyl-hexamethylene diisocyanate, or hexamethylene diisocyanate, or combinations thereof.

21. The radiation curable composition of claim 1, wherein the isocyanate-reactive (meth)acrylate comprises, consists essentially of, or consists of hydroxyethyl (meth)acrylate, 2-hydroxypropyl (meth)acrylate, 3-hydroxypropyl (meth)acrylate, 4-hydroxybutyl (meth)acrylate, caprolactone (meth)acrylate, glycerol acrylate methacrylate, glycerol di(meth)acrylate, or combinations thereof.

22. The radiation curable composition of claim 5, wherein the monohydric alcohol not possessing a (meth)acrylic moiety comprises methanol, ethanol, isopropyl alcohol, butanol, pentanol, 2-ethyl hexanol, cetyl alcohol, geraniol, inositol, or menthol, or combinations thereof.

23. The radiation curable composition of claim 1, wherein the diluent component comprises, consists essentially of, or consists of reactive diluent monomers, wherein the reactive diluent monomers comprise 2-ethylhexyl acrylate, 2-phenoxyethyl acrylate, 2-(2-ethoxyethoxy)ethyl acrylate, n-vinyl pyrrolidone, dimethylacryl-amide, n-vinylcaprolactam, ethoxylated 2-phenoxy ethyl acrylate, 4-hydroxy butyl acrylate, lauryl acrylate, isobornyl acrylate, caprolactone acrylate, ethoxylated nonylphenol acrylate, tridecyl acrylate, or isodecyl acrylate, or combinations thereof;
and/or
wherein the photoinitiator component comprises, consists essentially of, or consists of 2,4,6-trimethylbenzoylethoxyphenylphosphine oxide, 2,4,6-trimethylbenzoyldiphenylphosphine oxide, α-hydroxycyclohexyl phenyl ketone, 2-hydroxy-2-methyl-1-phenylpropanone, 2-hydroxy-2-methyl-1-(4-isopropylphenyl)propanone, 2-hydroxy-2-methyl-1-(4-dodecylphenyl)propanone, 2-Hydroxy-1-{4-[4-(2-hydroxy-2-methyl-propionyl)-benzyl]-phenyl}-2-methyl-propan-1-one, or 2-hydroxy-2-methyl-1-[(2-hydroxyethoxy)phenyl]propanone, or combinations thereof.

24. The radiation curable composition of claim 1, wherein the radiation curable composition consists of, relative to the weight of the entire radiation curable composition:

from 10 to 65 wt. % of the urethane oligomer;
from 30 wt. % to 85 wt. % of the diluent component;
from 1 wt. % to 5 wt. % of the photoinitiator component;
and from 1 wt. % to 10 wt. % of the additive component.

25. The radiation curable composition of claim 1, wherein a cured film of the radiation curable composition possesses
(a) a segment modulus (E) of less than 1.0 MPa;
(b) a strain energy release rate ($G_0$) of greater than 25 J/m$^2$; and/or
(c) a ratio of $G_0$/E (in J/(m$^2$·MPa)) of greater than 70.

26. A method of coating an optical fiber comprising the steps of:
drawing a glass optical fiber through a draw tower;
applying a primary coating composition onto the surface of the glass optical fiber;
optionally, imparting a dose of UV light sufficient to at least partially cure said primary coating composition;
applying a secondary coating composition to the primary coating composition;
exposing the primary coating composition and the secondary coating composition to at least one radiation source capable of emitting ultraviolet radiation to affect curing of said primary coating composition and said secondary coating composition, to form a cured primary coating on the surface of the optical fiber, and a cured secondary coating on the surface of the cured primary coating; wherein the primary coating composition is the radiation curable composition according to claim 1.

27. A primary coating for an optical fiber which is the cured product of a composition according to claim 1 or is coated by the method according to claim 26.

28. A coated optical fiber comprising the reaction product of a composition according to claim 1.

29. The coated optical fiber according to claim 28, wherein the coated optical fiber possesses an in-situ modulus of less than 1.5 MPa.

30. An optical fiber cable comprising a coated optical fiber according to claim 28.

* * * * *